United States Patent [19]

Hardin et al.

[11] Patent Number: 5,642,299
[45] Date of Patent: *Jun. 24, 1997

[54] ELECTRO-OPTICAL RANGE FINDING AND SPEED DETECTION SYSTEM

[76] Inventors: Larry C. Hardin, 735 Harrison, Bandon, Oreg. 97411; Larry V. Nash, 31770 Chantrelle La., Gold Beach, Oreg. 97444

[*] Notice: The term of this patent shall not extend beyond the expiration date of Pat. No. 5,586,063.

[21] Appl. No.: 693,681

[22] Filed: Aug. 12, 1996

Related U.S. Application Data

[63] Continuation of Ser. No. 466,879, Jun. 6, 1995, Pat. No. 5,586,063, which is a continuation of Ser. No. 116,078, Sep. 1, 1993, abandoned.

[51] Int. Cl.⁶ .................................................. G01C 3/00
[52] U.S. Cl. .......................... 364/561; 364/460; 382/106; 340/937; 356/3; 356/4.01
[58] Field of Search ............................... 364/565, 560, 364/561, 426.04, 460, 461, 436; 382/100, 103, 106, 107; 324/160, 161; 340/936, 937, 942; 356/3, 4.01, 28, 28.5

[56] References Cited

U.S. PATENT DOCUMENTS

| | | | |
|---|---|---|---|
| 3,788,201 | 1/1974 | Abell | 95/1.1 |
| 4,135,817 | 1/1979 | Young et al. | 356/28 |
| 4,173,010 | 10/1979 | Hoffmann | 340/936 |
| 4,257,703 | 3/1981 | Goodrich | 356/4 |
| 4,433,325 | 2/1984 | Tanaka et al. | 340/942 |
| 4,495,589 | 1/1985 | Hirzel | 364/565 |
| 4,671,650 | 6/1987 | Hirzel et al. | 324/160 |
| 4,727,258 | 2/1988 | Tyssen et al. | 250/561 |
| 4,847,772 | 7/1989 | Michalopoulos et al. | 364/436 |
| 4,969,735 | 11/1990 | Gilligan | 382/1 |
| 5,066,950 | 11/1991 | Schweitzer et al. | 340/937 |
| 5,159,557 | 10/1992 | Ogawa | 364/460 |
| 5,161,107 | 11/1992 | Mayeaux et al. | 340/937 |
| 5,163,002 | 11/1992 | Kurami | 364/460 |
| 5,307,136 | 4/1994 | Saneyoshi | 356/1 |
| 5,402,118 | 3/1995 | Aoki | 364/436 |
| 5,402,346 | 3/1995 | Lion et al. | 364/436 |

*Primary Examiner*—Ellis B. Ramirez
*Assistant Examiner*—Eric W. Stamber
*Attorney, Agent, or Firm*—Chernoff, Vilhauer, McClung & Stenzel

[57] ABSTRACT

A passive optical speed and distance measuring system includes a pair of camera lenses positioned along a common baseline a predetermined distance apart and controlled by an operator to capture images of a target at different times. The camera lenses are focused on light sensitive pixel arrays which capture target images at offset positions in the line scans of the pixel arrays. A video signal processor with a computer determines the location of the offset positions and calculates the range to the target by solving the trigonometry of the triangle formed by the two camera lenses and the target. Once the range to the target is known at two different times the speed of the target is calculated.

7 Claims, 26 Drawing Sheets

TO FIG. 22B

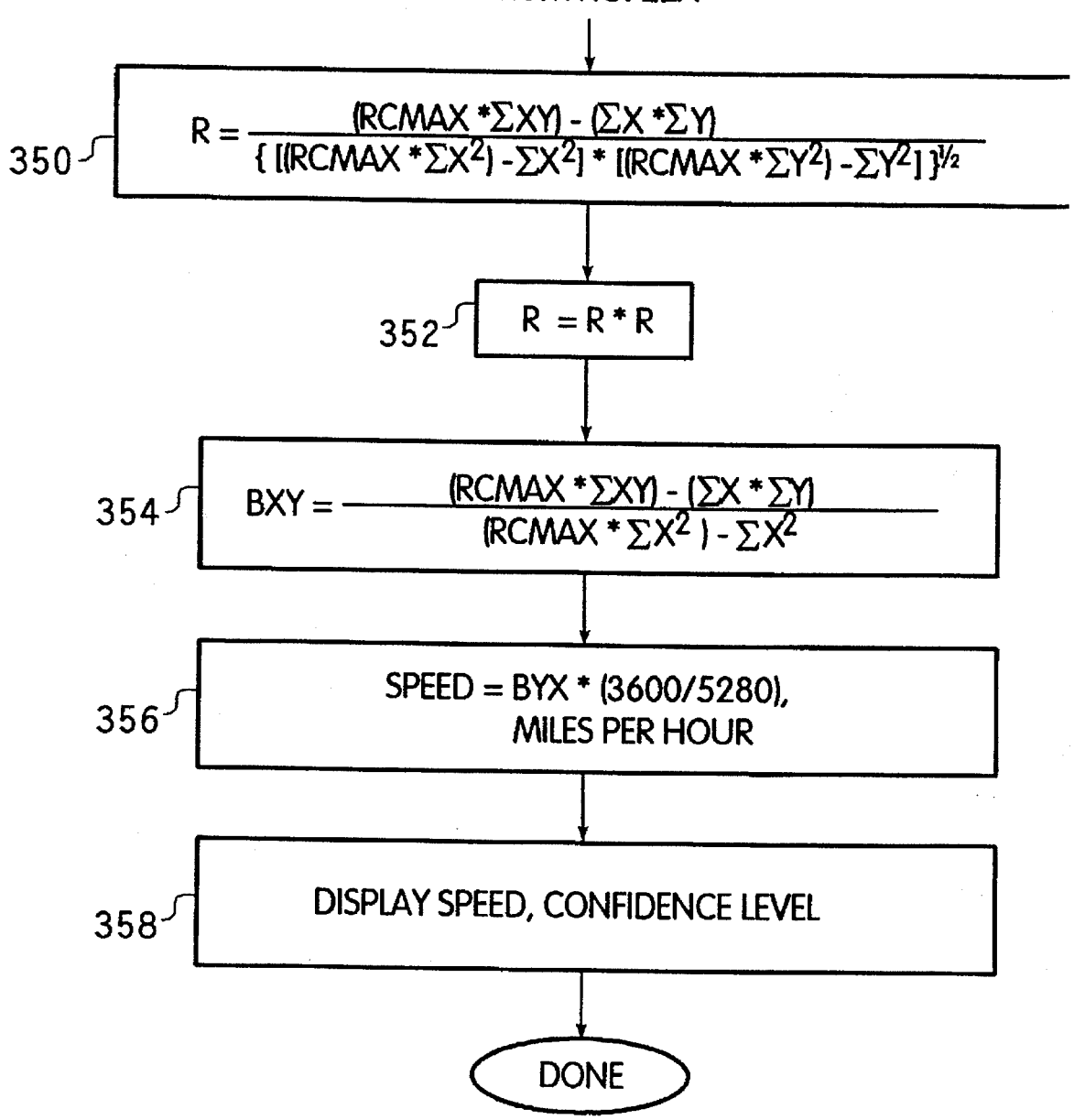

ELECTRO-OPTICAL RANGE FINDING AND SPEED DETECTION SYSTEM

The following application is a continuation of application Ser. No. 08/466,879 filed Jun. 6, 1995, now U.S. Pat. No. 5,586,063, which is in turn a continuation of application Ser. No. 08/116,078 filed Sep. 1, 1993, now abandoned.

BACKGROUND OF THE INVENTION

The following invention relates to a system for ranging and speed detection, and more particularly relates to an optical system for determining range and speed that is passive and does not require an energy transmitter to accomplish its purpose.

Most speed detection systems require a transmitter to transmit energy towards a moving target which is reflected back to a receiver. Various schemes are then provided for measuring the time of transmission and the return of the energy in order to calculate the range to the target and its speed. Radar is a primary example of this technique, and radar guns are conventionally used by law enforcement agencies for traffic control. The problem with radar as a traffic control device is that target acquisition and measurement are ambiguous. It can frequently not be determined which target out of a multitude of possible targets is responsible for generating any particular speed indication. Another problem is that radar can be detected by receivers tuned to the proper frequency. Laser ranging systems are also available but such systems are also detectable at the target and are prohibitively expensive.

In the past there have been attempts to design purely optical speed measuring systems, but all suffer from one or more defects regarding accuracy or cost of implementation. For example, passive optical systems are available which calculate an oncoming object's velocity by acquiring images at two different times and comparing the relative sizes of the images in the field of view as a function of time. Examples of such devices are shown in the U.S. Pat. Nos. to Goodrich No. 4,257,703, Abel No. 3,788,201 and Michalopoulous et al. No. 4,847,772.

Other prior art devices utilize trigonometric relationships by capturing an image at different times at known marker positions. Such systems are shown in Tyssen et al. U.S. Pat. Nos. 4,727,258 and Young et al. No. 4,135,817. These systems, however, require that the time of capture of an image be synchronized with the appearance of the target object at a known marker position. This is not always practical and sometimes requires that the cameras be spaced widely apart or placed at different locations.

These and other prior art passive optical speed detection systems are generally overly complex and/or impractical or require external markers and the like. What is needed, therefore, is a practical, compact, low cost, optical speed and/or distance detecting system which can be used at any desired location with a minimum of set-up time and complexity.

SUMMARY OF THE PRESENT INVENTION

According to the present invention, a passive optical speed and distance measuring system is provided which includes a pair of video camera lenses pointed along respective lines of sight towards a target. The lenses are positioned along a common baseline a predetermined distance apart. A timer causes both camera lenses to capture a first target image in the field of view of each lens at a first time $T_1$ and also at a later time $T_2$. The images are transferred to a range measuring means which determines a distance $R_1$ from the common baseline to the target at a time $T_1$ and for determining the distance $R_2$ from the baseline to the target at a time $T_2$. A calculating means determines the speed of the target by solving, for example, the equation, speed=$(R_2-R_1)/(T_2-T_1)$ or by using a linear regression method employing additional ranges $R_n$ determined at times $T_n$. Preferably, the lines of sight of each of the camera lenses are parallel, and the lenses may be included in separate cameras, or, through the use of mirrors and prisms, each lens may be focused on a common image detection device such as a charge coupled device (CCD). Also, the cameras are generally of the type that provide an image which is electronically scanned in a pixel array of light sensitive devices where the light intensity values of the pixels in the array may be digitized and stored for processing by a computer.

The first and second camera lenses each focus images found in their respective fields of view on a pixel map. Contained in the pixel map is at least a partial image of the target which is found in the field of view of each camera lens. The range measuring means includes comparison means for correlating the position of the target image on the first pixel map with the same corresponding target image on the pixel map of the second camera lens. This correlation is used to determine the angle between the target and the respective lines of sight of the first and/or second camera lenses.

The pixel map may comprise a single line scan of video data and the comparison means includes means for determining the differences of video data intensities at each respective pixel location in the respective pixel maps to find the correlation between the target images. This correlation will occur at a global null which will be the position giving a minimum intensity difference between the pixel maps. This pixel location is a linear function of the angle between the target image and the line of sight of at least one of the cameras.

The video data contained in the pixel map may be converted to digital data for processing by a computer program. The computer program calculates the absolute value differences in intensity between pixels in the pixel maps from the first and second video cameras at successively offset shift positions between the two pixel maps. Alternatively, preprocessing circuitry may be used to shift the pixel maps relative to each other to create a list of the values at all possible pixel offsets. The computer may then search the list for the global null.

The first and second lenses may be mounted in a camera array which further includes a third camera for sighting and target acquisition. The first and second cameras generally should have narrow fields of view to avoid optical background clutter, but the third camera may have a wide field of view for target acquisition. Additionally, all three cameras may be mechanically connected so that the first and second camera lenses may be slaved to rotational motion by the third (target acquisition) camera. The third camera may further include an alphanumeric video generator for providing predetermined message data upon acquisition of a selected target by an operator. Such data could include, for example, the time and date and other information about the target.

Alternative methods of determining the offset angle of the target image relative to the line of sight may include detecting the edges of the target as the target changes its position relative to the optical background. Since the background does not change over most of the field of view as the target moves, signal processing means may be used to discriminate between a moving edge and static background video data.

Generally the cameras and/or camera lenses are mounted side-by-side along a horizontal line which is parallel to the line scan of the light sensitive device in the focal plane of the lenses. However, if desired, the light sensitive element may be oriented so that the line scan direction is perpendicular to the baseline. The signal processing to determine the target image offset from the line of sight in this case is slightly different from that which is used when the light sensitive element is scanned parallel to the baseline. In this embodiment a video line scan of one of the cameras serves as a "template" and whole line scans of the other camera are compared to the template line to establish image correlation, thus determining the offset. This method is more accurate than determining the offset by comparison of overlapped fractions of a line but requires more memory and computational time.

Determination of the difference in pointing angles to the target between the two cameras (the offset angle) allows a computer associated with this system to accurately estimate the distance to the target. The computer does this by solving the essential trigonometry of the camera configuration. Because the two camera lenses are mounted along a common baseline a predetermined distance apart, lines extending from each of the camera lenses to the target form a triangle. With both offset angles known, a trigonometric solution that solves for the distance from the target to the center of the baseline can be calculated. This measurement is performed at least two different times and the difference in range to the target as a function of the time difference may be used to calculate the speed of the target.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 21 is a schematic diagram of a two-dimensional memory array containing range and time data.

FIGS. 22A and 22B are collectively a flow chart diagram illustrating a linear regression calculation for the method shown in FIG. 20.

DETAILED DESCRIPTION OF THE INVENTION

Figure 1:
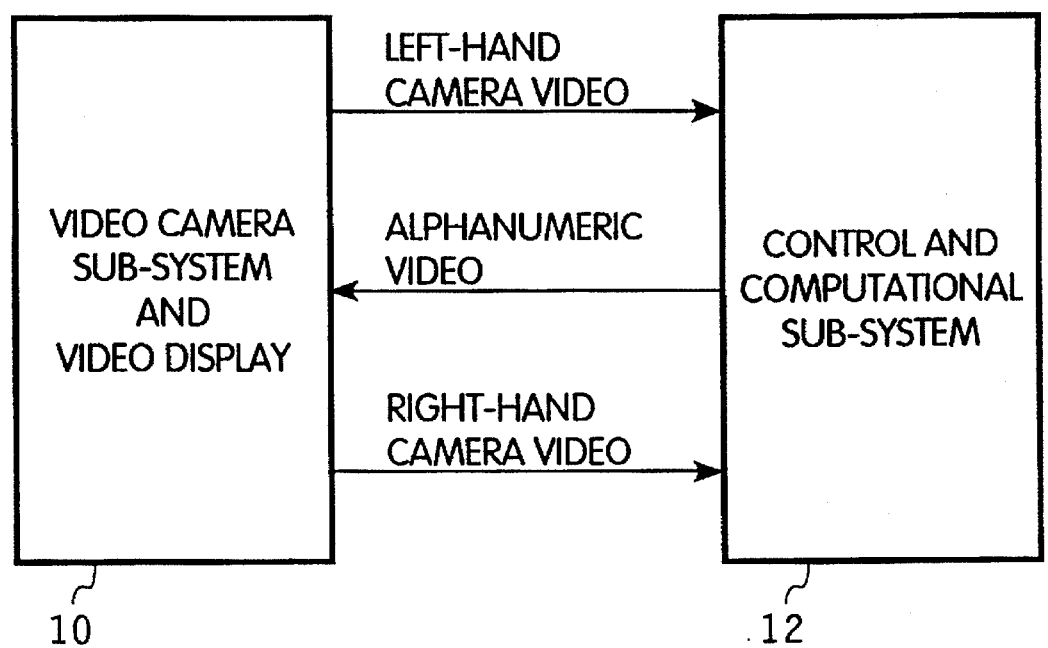
FIG. 1 is a simplified block schematic diagram of the system of the invention.
Figure 2:
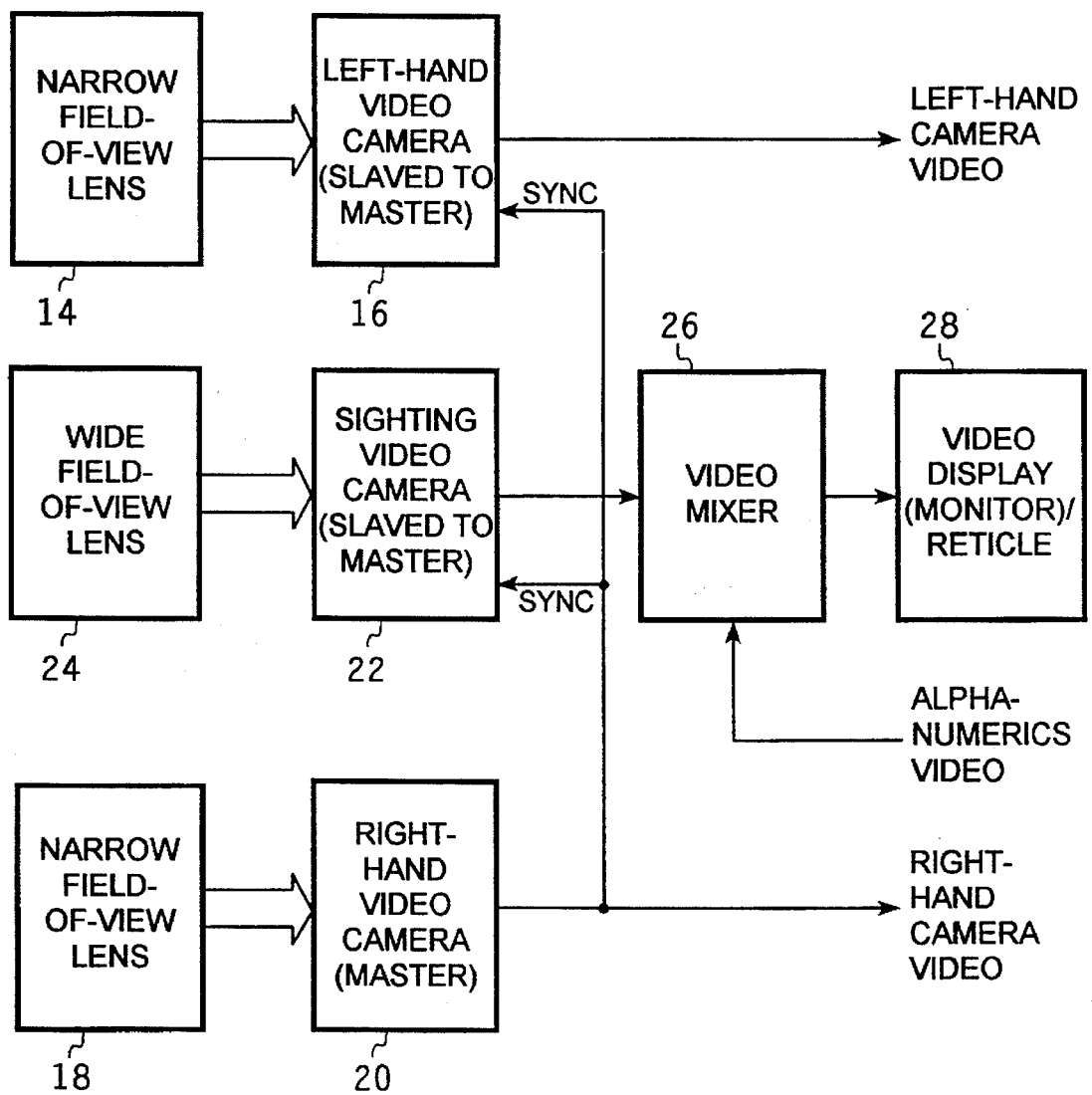
FIG. 2 is a block schematic diagram of the video camera subsystem shown in FIG. 1.

Referring to FIG. 1, the invention includes a video camera subsystem and video display 10 connected to a control and computational subsystem 12. The camera subsystem 10 provides left- and right-hand camera video to the control subsystem 12 and the control subsystem supplies alphanumeric video to the video camera subsystem. FIG. 2 which shows an expanded block diagram of the video camera subsystem includes a narrow field-of-view lens 14 which provides an optical image to a left-hand video camera 16. A second narrow field-of-view camera lens 18 provides an optical image to a right-hand master video camera 20. The right-hand video camera includes sync which is supplied to the left-hand video camera 16 and to a sighting video camera 22 which is also slaved to the right-hand video camera 20. The sighting video camera 22 includes a wide field-of-view lens 24 for target acquisition.

All of the cameras 16, 20 and 22 are of the type that include a pixel matrix array of light sensitive devices such as a CCD. As such the pixel array is scanned electronically in horizontal or vertical lines to provide video data which represents light intensity at each scanned pixel location. In addition, the output of the sighting video camera 22 provides video to a video mixer 26 which may receive an alphanumeric video input. The wide field-of-view image of the camera 22 along with the alphanumeric video may be displayed on a video display 28.

Figure 3:
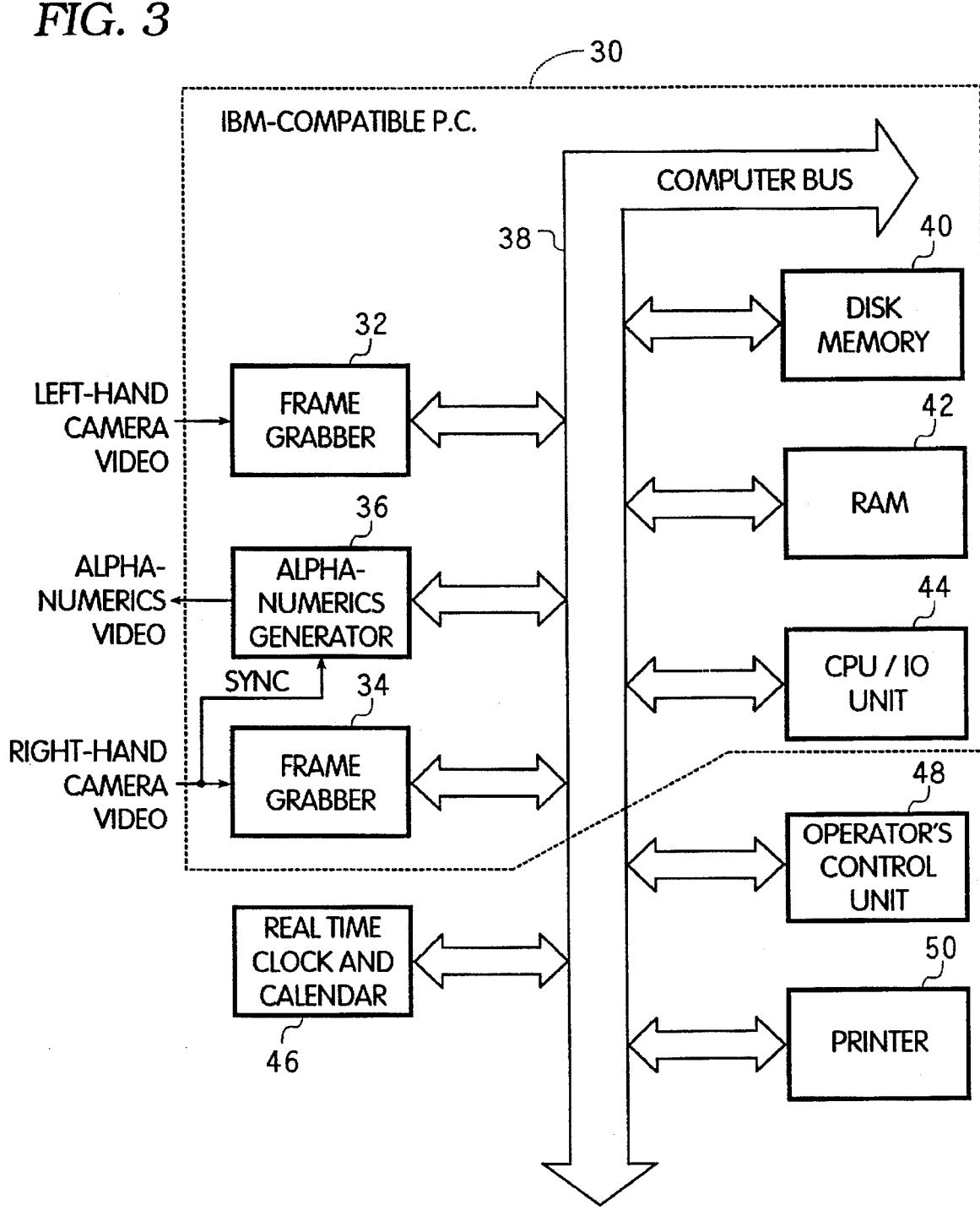
FIG. 3 is a block schematic diagram of the control and computational subsystem shown in FIG. 1.

FIG. 3 is an expanded view of the control and computational subsystem 12. The subsystem 12 consists primarily of a personal computer 30 (shown in dashed outline) which may be any type of IBM®-compatible personal computer. The computer 30 includes frame grabbers 32 and 34 for the left-hand camera video and the right-hand camera video, respectively. An alphanumeric generator 36 is slaved to the sync provided by the right-hand video camera 20. The computer includes a computer bus 38 which couples the frame grabber 32, the alphanumerics generator 36 and the frame grabber 34 to a disk memory 40, random access memory 42 and a CPU/IO unit 44. External to the computer 30 the computer bus 38 is also coupled to a real time clock and calendar 46, operator's control unit 48 and a printer 50.

Figure 6:
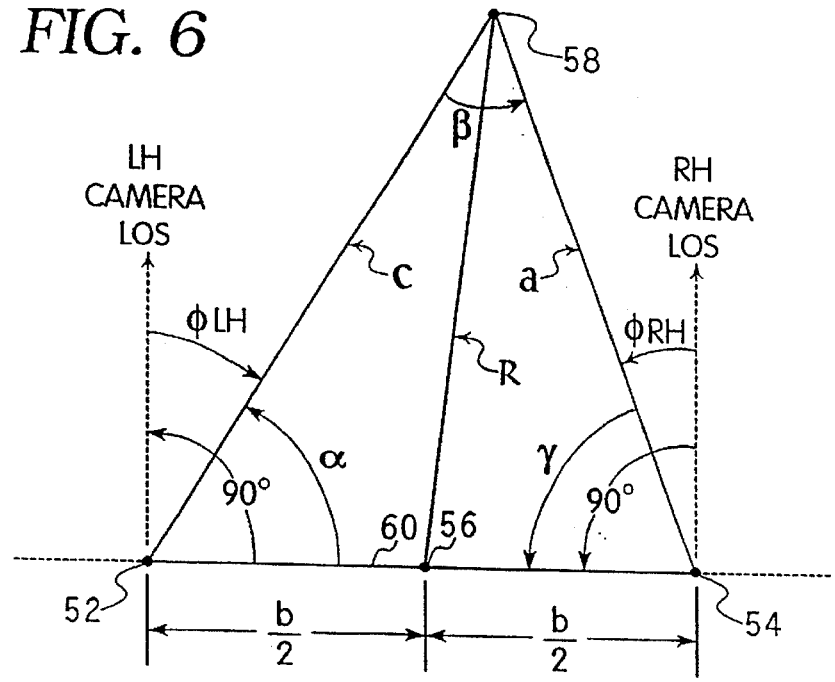
FIG. 6 is a schematic diagram of the overall geometry of the optical range and speed detecting system of the present invention.

The system geometry is illustrated in FIG. 6. The left-hand camera lens 14 is situated at a point 52 and the right-hand camera lens 18 is situated at a point 54. The wide field-of-view lens 24 is located midway between points 52 and 54 at a point 56. The target is located at a point 58 in the field of view of all three cameras. Preferably the respective lines of sight of the narrow field-of-view cameras located at points 52 and 54 are parallel as indicated by the dashed lines in FIG. 6. An angle $\phi_{LH}$ indicates the angle between the target point 58 and the line of sight of the camera located at 52. Similarly, $\phi_{RH}$ indicates the angle between the line of sight and the target for the right-hand camera. The two cameras are situated along a baseline 60 having a length "b" where the center wide field-of-view camera lens 14 is located midway between the two narrow field-of-view cameras 14, 18 at a distance b/2 along the baseline. From this point the range to the target point 58 is indicated as "R." A triangle having sides "a," "b" and "c" is thus formed between the target location 58 and the right- and left-hand camera locations 52 and 54. This triangle includes internal angles α (alpha) at the left-hand camera location, γ (gamma) at the right-hand location and β (beta) at the target location. The system determines the range R to the target by solving the trigonometry of the aforementioned triangle. In order to determine the speed of the target, it performs this calculation at two different times and divides the difference in range by the elapsed time between measurements.

Figure 4:
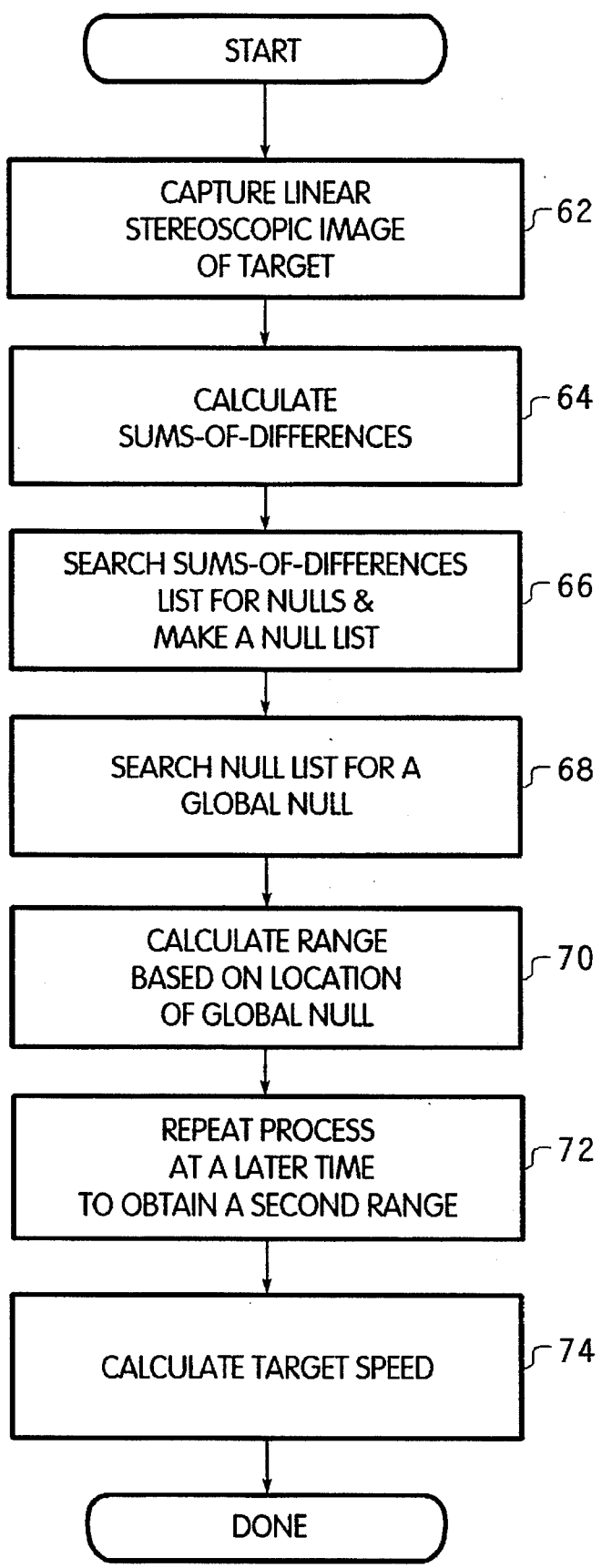
FIG. 4 is a simplified flow chart diagram of a computer program used to calculate the range and speed of a moving target.

FIG. 4 illustrates in flow chart diagram form the essential system operational method. After "START," the system, at block 62, captures a linear stereoscopic image of the target. This image consists of a single line scan of video data captured by the left-hand and right-hand lenses simultaneously. This linear scan is conducted at times $T_1$ and $T_2$. At block 64 the system calculates the sums of the differences in pixel intensity between the right-hand and left-hand scan lines, respectively, at each of the two times for the total possible number of pixel offset positions between the two scan lines. At block 66 the system performs a search of the sums of differences list for nulls and a null list is made. At block 68 the system searches for a global null and records the pixel offset location at which it was found. A global null is the offset location that yields the minimum intensity difference between images. This offset location is proportional to an angle between the line of sight of at least one camera and the target. At block 70 the system calculates the range to the target based upon the number of pixels offset required to achieve the global null. At block 72 the process is repeated for the second line pair scan and at block 74 the system calculates the target speed by solving the equation:

$$S=(R_2-R_1)/(T_2-T_1).$$

Figure 4A:
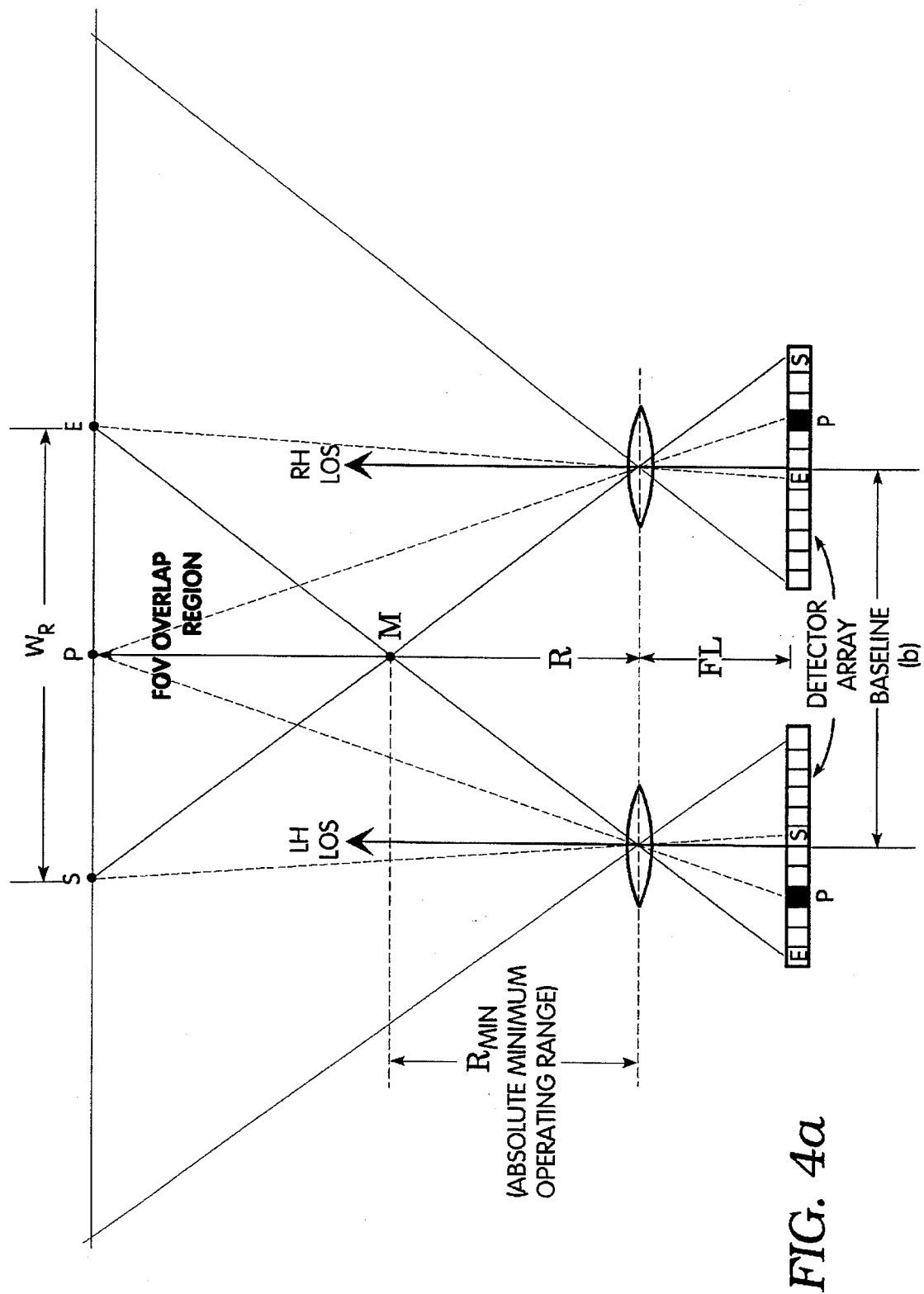
FIG. 4a is a schematic illustration of the optical relationships in the system using separate cameras with the line scans parallel to the baseline.
Figure 5:
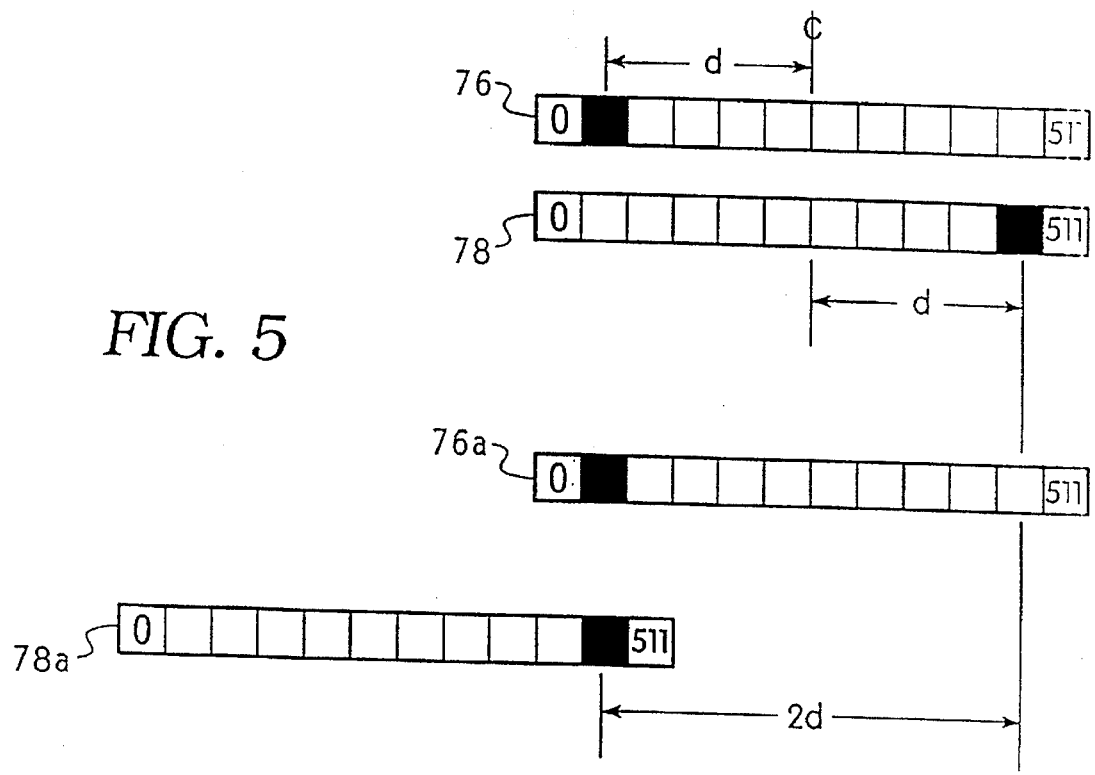
FIG. 5 is a schematic illustration of the geometry of pixel maps which are used to calculate the angles between the target center and the lines of sight of the camera lenses.

This method is graphically illustrated with respect to the drawings in FIG. 4a and FIG. 5. FIG. 4a illustrates the field of view overlap region at the range to the target, R (defined by points S, P, E and M). WR is the width of this region. The width, WR, is a fraction of a line, approaching unity as the range approaches infinity. The point where WR goes to zero (M) is the absolute minimum operating range (Rmin). Note that the overlap region width (the line segment between points E and S) is imaged on both detector arrays, but at different locations on each array. FIG. 5 represents the two line pair scans from FIG. 4a where the upper pixel scan 76 represents the left-hand camera lens pixel map and the lower scan 78 represents the right-hand camera lens pixel map. The dark pixel in each scan represents the calculated location of the target and the shift of distance 2d is the offset position where a global null occurs. This embodiment of the invention presumes that at least a portion of the target can be found within the field of view common to both lenses. This is shown graphically in FIG. 4A.

Figure 7:
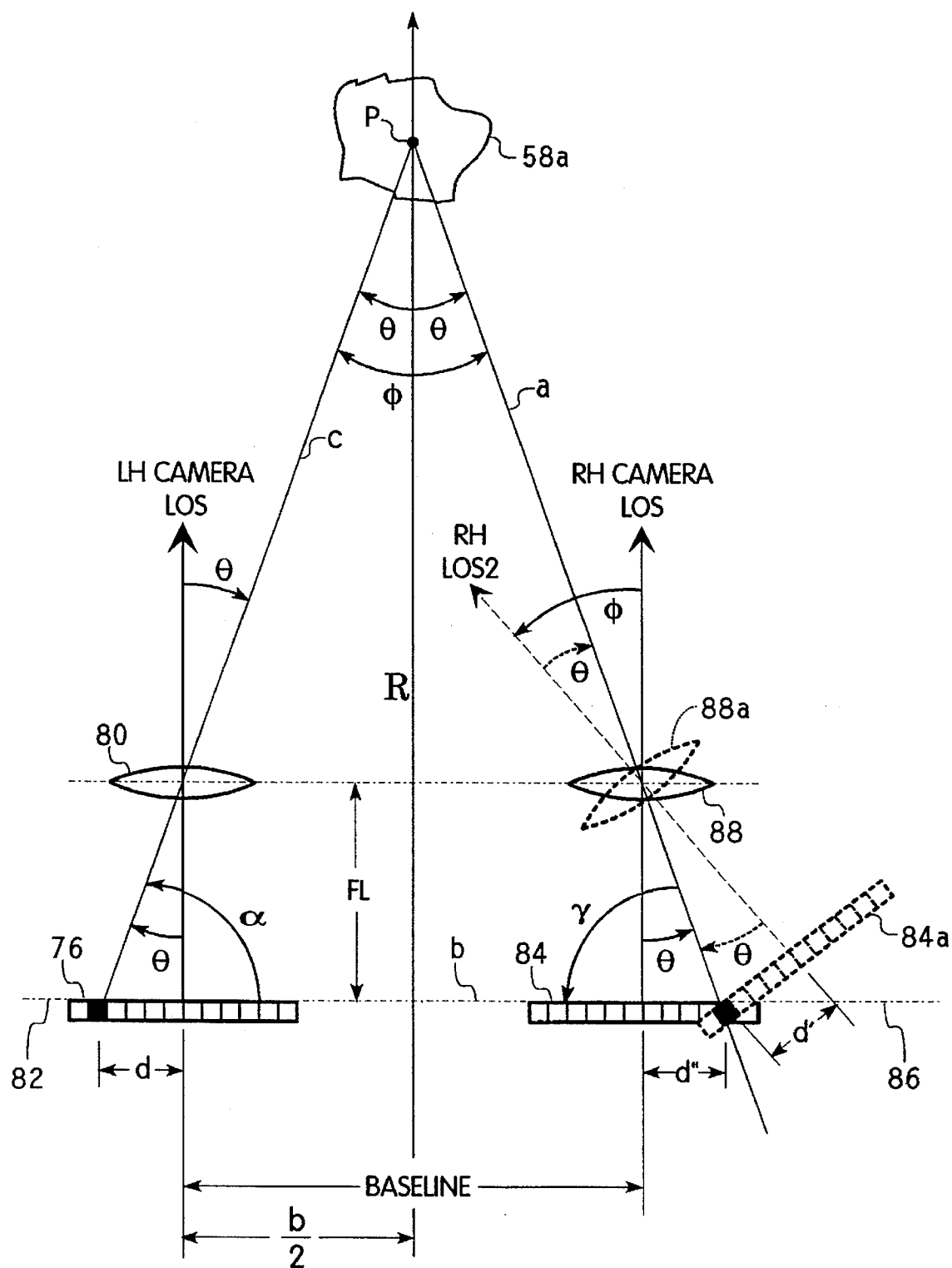
FIG. 7 is a schematic diagram illustrating the relationship between the system geometry of FIG. 6 and the pixel maps of FIG. 5.

FIG. 7 represents a special case for the generic system geometry shown in FIG. 6. Referring again to FIG. 5, the system determines the distance d which is one-half the pixel offset between the pixel maps 76 and 78. It does this by correlating the two lines. Correlation occurs at a total offset 2d as shown in the lower portion of FIG. 5 where the right-hand camera lens pixel map 78a has been offset with respect to the left-hand camera lens pixel map 76a to produce a total offset equal to 2d. When pixel intensities are compared at this offset, a global null will be produced which represents a minimum in the absolute differences in pixel intensities between the pixel maps at this offset location. The reason for this is that at the global null the target image is the dominant object common to both camera fields of view. The process is akin to shifting one of two overlapping fields of view visually to produce a coincident field of view. The pixel offset needed to achieve this is then directly proportional to the angle between at least one of the camera lenses and the target image relative to its original line of sight.

This method is graphically illustrated in FIG. 7. A ray from the target 58a at point P makes an angle θ between line c and the left-hand camera lens line of sight. This ray passes through the left-hand camera lens 80 and is focused on a pixel in the line pixel map 76 located in the focal plane 82 of the lens 80. Similarly, on the right side, a ray from point P on the target 58a extends along line "a" to a line pixel map 84 which is located in the focal plane 86 of the right-hand camera lens 88. Both pixel maps are located in their respective focal planes at the focal length "FL" of lenses 80 and 88 which are identical. At the focal length FL, the ray from the target extending along line "c" or line "a" makes an angle θ with the camera line of sight. This angle is the same angle as the angle between the lines c and a, respectively, and line R which represents the range to the target 58A. The calculation step outlined in block 70 of FIG. 4 calculates the range to the target by first determining the value of angle θ. Angle θ is determined by finding the shift, in number of pixels, at which the absolute differences in pixel intensities between respective pixels and pixel map are at a minimum. This is equivalent to rotating the right-hand pixel map about an axis at the right-hand lens 88 corresponding to an angle φ which is equal to two times θ. This imaginary rotation of the pixel map is shown graphically in FIG. 7 wherein pixel map 84A has been rotated through an angle α so that the dark (target image) pixel in each map is at the same location. The dashed line at lens 88A indicates the revised "rotated" position of the right-hand camera lens.

In actuality the lenses remain pointed along their respective lines of sight. It is the mathematical processing, however, that performs the mechanical equivalent of an imaginary camera rotation through angle φ. The dimension d shown on FIG. 7 represents the pixel offset distance from the center of the pixel map at which image correlation occurs. At ranges where R is much greater than the length of the baseline b, the tangent function of θ is linear and the offset distance d is then directly proportional to θ. This relationship provides the means of calculating the range R as will be explained below.

Figure 9A:
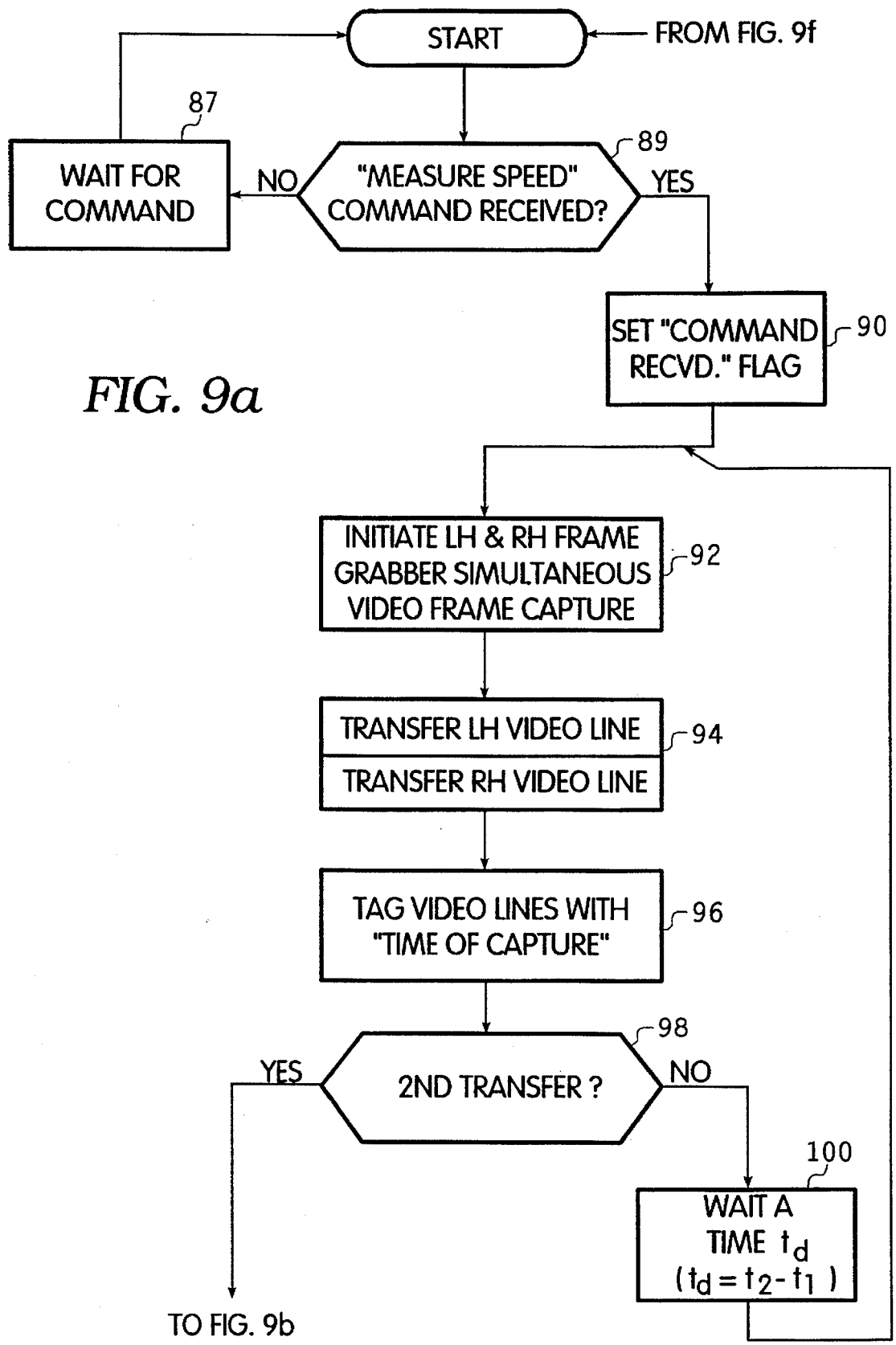
FIG. 9a–9f are a flow chart diagram illustrating the method of calculating the range and speed to the target using the system of FIG. 4.
Figure 9B:
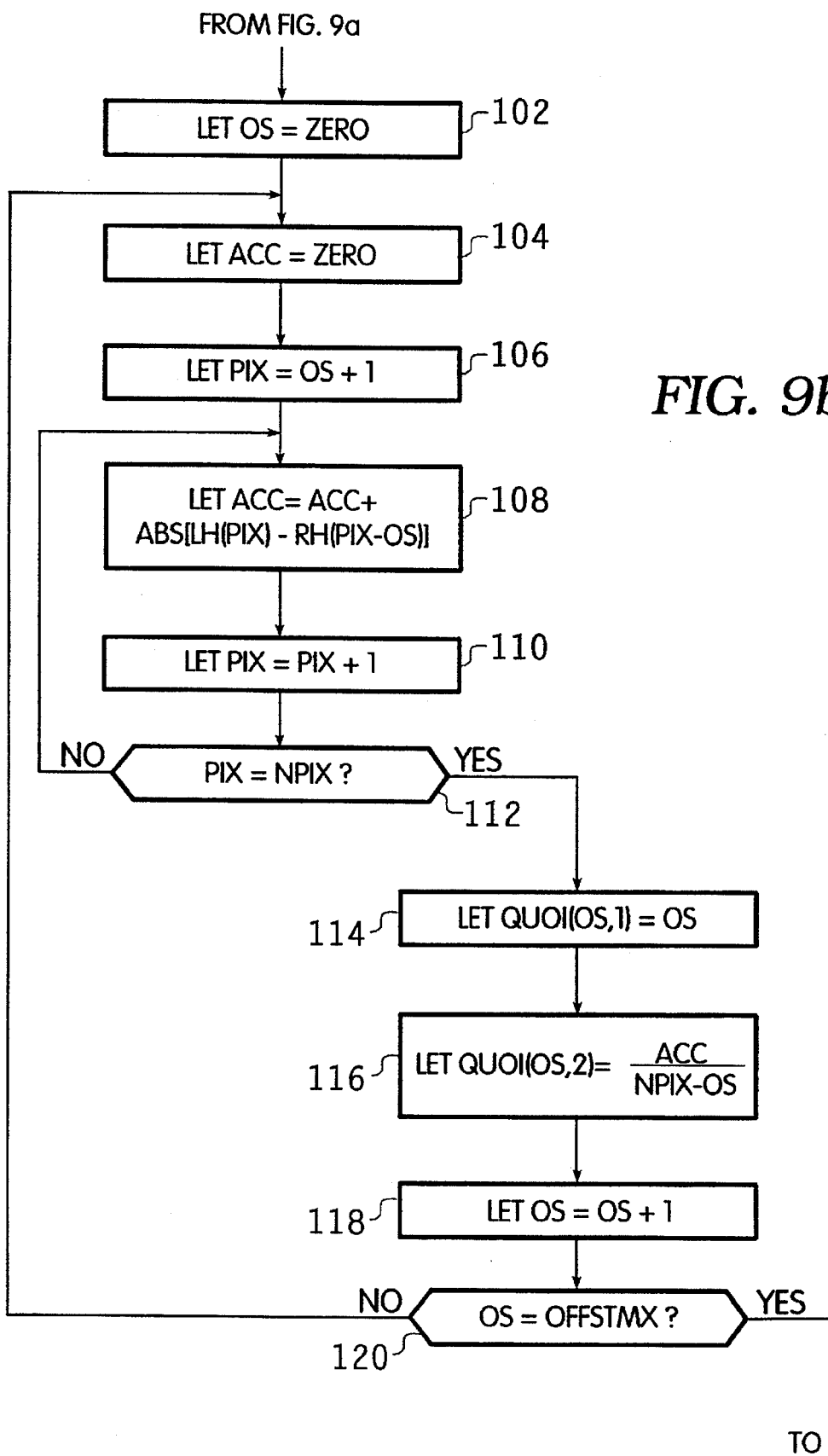
Figure 9C:
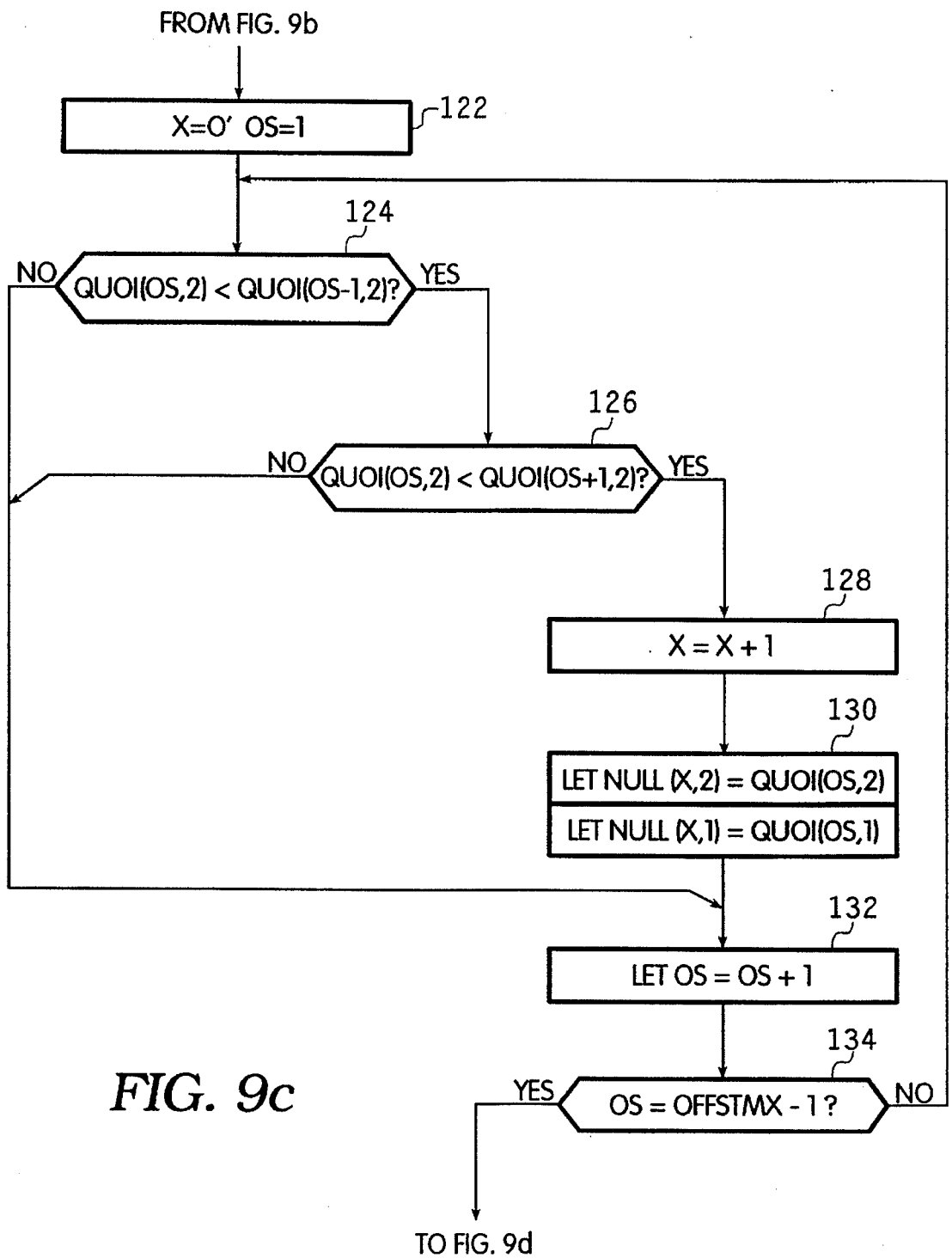

Referring to FIGS. 9a through 9f, a flow chart diagram is shown which describes the method by which the control and computational subsystem measures the target speed. Once system start-up is initiated, computer software under the control of the CPU/IO unit 44 in the computer 30 enters a loop (blocks 87, 89) which waits for a "measure speed" command. The command is initiated by the operator's control unit 48 which may include a simple push button switch associated with the wide angle field-of-view camera 22. Once a desired target has been located by the operator and the button pushed, a "command received" flag is set (block 90) which initiates the simultaneous capture of video in the left-hand and right-hand frame grabbers 32 and 34, respectively (block 92). Next, the video lines that are captured are transferred from each frame grabber 32, 34 to the RAM 42 in the computer 30 (block 94). Next, both video lines are tagged with a time $T_1$ representing a time of capture (block 96). If the transfer is the first transfer, the program loops back to block 92 to repeat the sequence (blocks 98 and 100). After the second video line-pair transfer, two video line-pairs are stored in computer RAM tagged with times $T_1$ and $T_2$, respectively. Referring to FIG. 9b, the software then sets a variable OS (offset) equal to zero (block 102). Another variable, ACC, is also set equal to zero (block 104). A third variable, PIX, is made equal to OS plus 1 (block 106). The accumulator variable, ACC, is then made equal to ACC plus an expression which represents the absolute value of the difference in intensities between the left-hand pixel map and the right-hand pixel map at a predetermined offset position (block 108). The PIX variable is then incremented by one (block 110) and a loop is formed so that the calculation will be repeated until the variable PIX is equal to NPIX which represents the total number of pixels in the line of video (block 112). In a conventional video camera of this type there will be 512 pixels in a single horizontal line of video.

Figure 8:
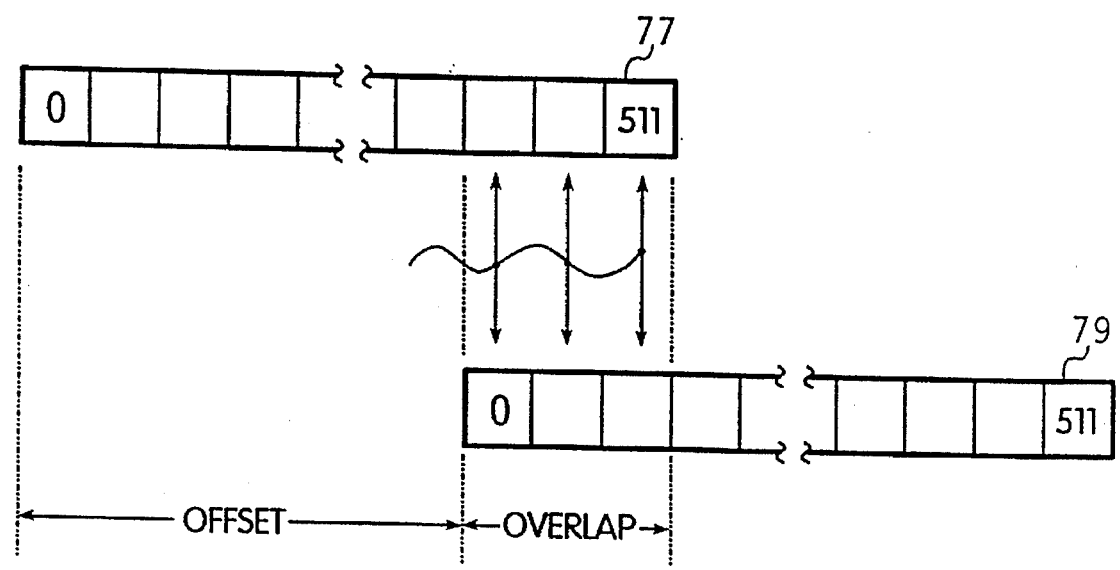
FIG. 8 is a schematic diagram illustrating the method by which the system calculates the target offset.

Once all of the values of ACC have been calculated, a new variable is defined QUO1 (OS,1) which is made equal to the offset OS (block 114). A second new variable QUO1 (OS,2) is made equal to ACC divided by NPIX-OS (block 116). This is done to normalize the absolute value of the differences in intensities between the two sums of pixel maps. The reason for this is that as the offset is shifted (refer to FIG. 8), there are fewer and fewer pixels in the overlap region. FIG. 8 represents the left-hand and right-hand pixel memory maps stored in RAM and designated 77 and 79, respectively. The arrows pointing between the memory maps 77 and 79 represent the summation of the absolute differences of the intensities at the pixel locations which are now represented as addresses in the memory map that are in the current overlap region. It can be seen that as the offset increases, the overlap region gets smaller. The variable OS is increased by one until the offset has reached a maximum which theoretically could be equal to the number of pixels, but, as a practical matter, is limited to about 20% of a line (about 100 pixels) for a typical 512 pixels/line camera. When this maximum is reached, the software then operates on the variables QUO1 (OS,1) and QUO1 (OS,2).

In order to find the null location which will ultimately represent the distance d which in turn represents the pixel offset, X is first made equal to zero and OS is made equal to 1 (block 122). X is a null counter variable and OS is the address of the second sum in the sum of differences list which is the QUO1 array. QUO1 is a two-dimensional array containing the sums of differences and the offset values at which they were calculated. This array has now been normalized as indicated above at block 116. Referring to blocks 124 and 126, each sum in the QUO1 list is compared to the adjacent sums in the list. If a sum is less than its adjacent sums, it is recorded as a null, that is, X is incremented as indicated at block 128. The null (labeled NULL) is then placed in a two-dimensional array along with its offset value (block 130). The list pointer OS is incremented at block 132 and the process is repeated until the last unambiguous NULL candidate (the next to last sum in the list) is evaluated as indicated at block 134.

Figure 9D:
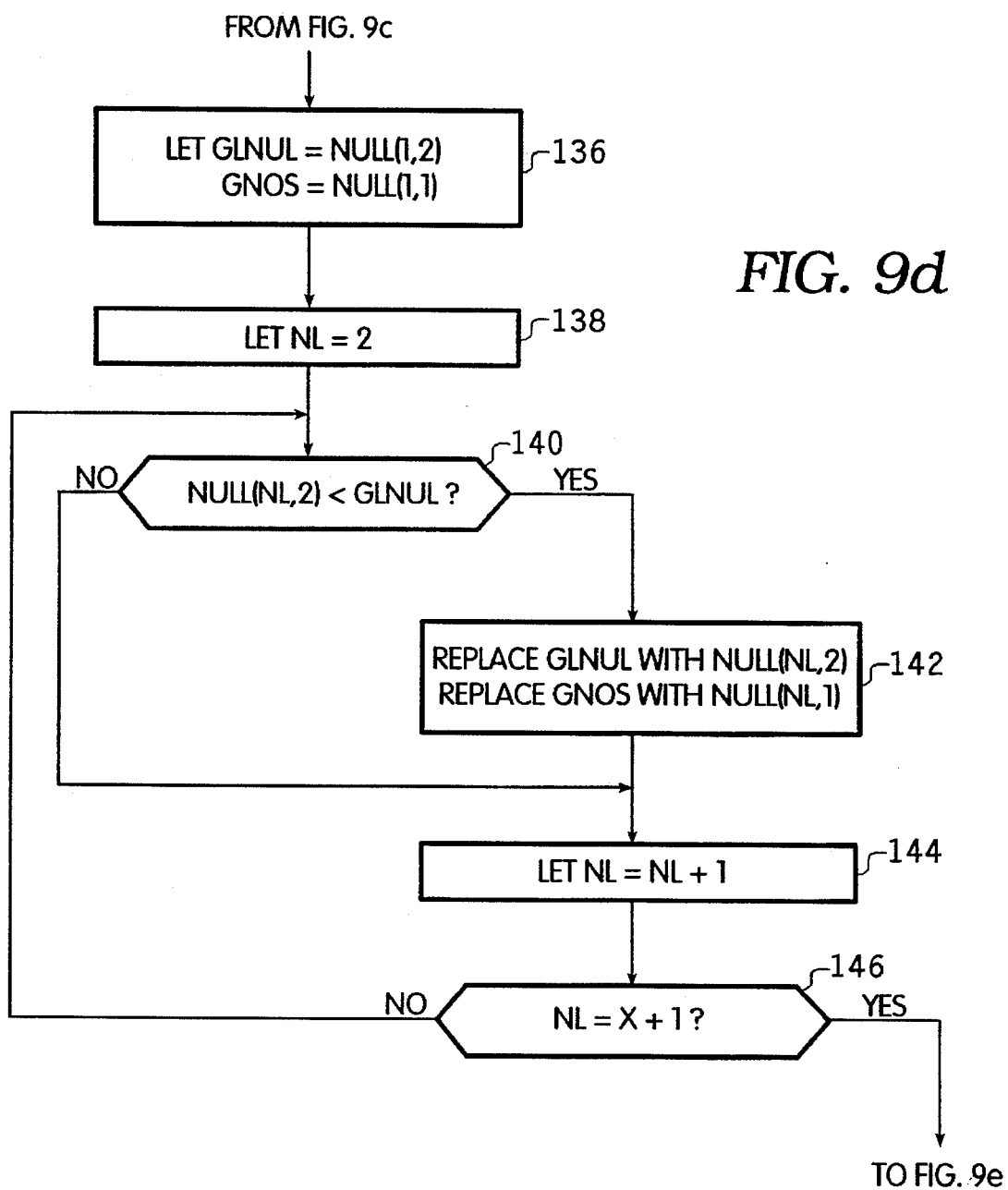

FIG. 9d describes a search routine which searches for a global NULL. The first NULL value in the NULL list is placed in a register named GLNUL. The corresponding offset is placed in a register named GNOS (block 136). The NULL list pointer NL is then set to the second value in the list where NL equals 2 (block 138). This NULL value is compared to the previous NULL value (block 140), and if the NULL value is less than the previous NULL value, it replaces that value in the GLNUL register and its offset replaces the value in the GNOS register (block 142). NL is then incremented (block 145) and the process is repeated until all X values in the list have been tested (block 146). The NULL value that survives in the GLNUL register will be the lowest value in the NULL list, and its corresponding offset in the GNOS register represents the pixel offset to the global NULL.

Figure 9E:
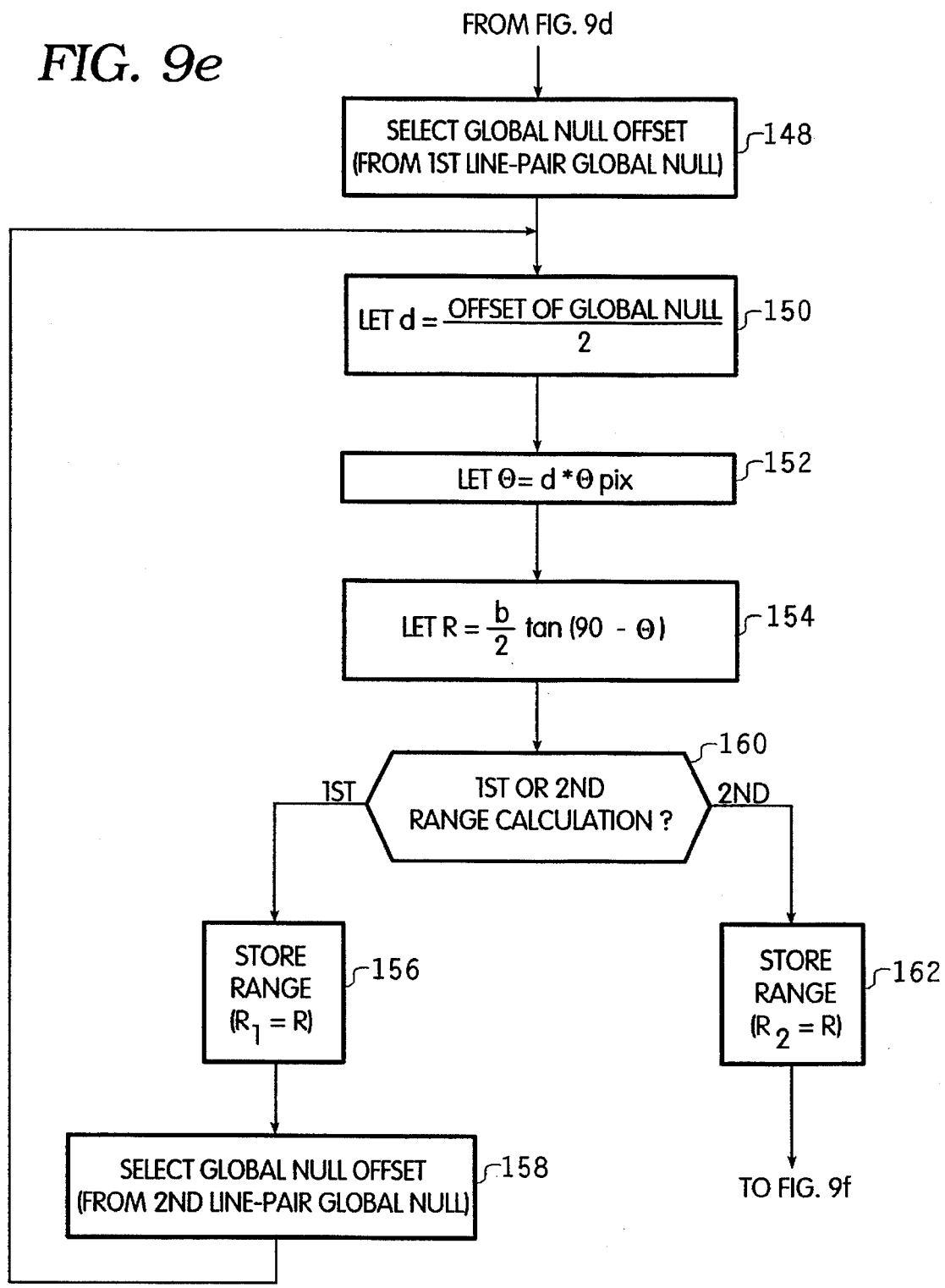

Knowing the pixel offset, the range to the target can now be calculated. The method for doing so is shown in FIG. 9e. The global NULL offset from the first line pair is selected (block 148). Next, distance d is defined as the offset of the global NULL divided by two (block 150). Next, an angle θ is made equal to d times a proportionality constant θPIX (block 152). The trigonometric equation which yields the range is then solved where R, which is the range, is equal to b/2 tan (90°−θ) (block 154). This is performed for the first range calculation and the program then loops back and performs it for the second range calculation (blocks 156 and 158). If the second range calculation has been performed (block 160), the range value is stored in memory (block 162).

Figure 9F:
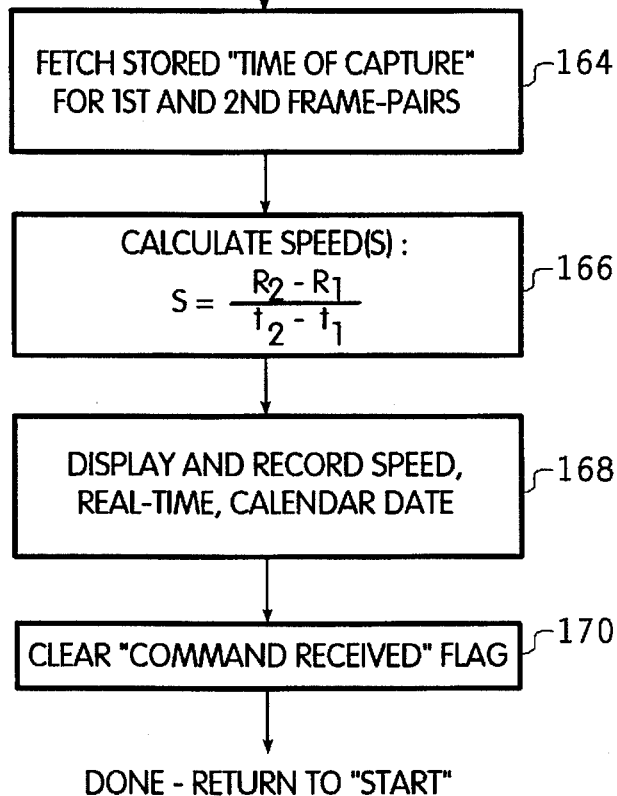

Speed calculation is shown in FIG. 9f. The time of capture is fetched from storage for the first and second frame pairs, respectively, which represent the values $T_1$ and $T_2$ (block 164). The speed is then calculated as the change in the values $R_1$ to $R_2$ as a function of the difference in times (block 166). The speed may then be stored and displayed along with the calendar date and other alphanumeric information generated by the real time clock and calendar 46 (block 168). Once this occurs, the "command received" flag is cleared and the program returns to start (block 170).

A second embodiment of the invention is shown in FIGS. 10 and 11a through 11c. The hardware configuration for this embodiment is the same as described above in FIGS. 1, 2 and 3. What is different about this alternative embodiment, termed the "edge detection" method, is the way in which software present in the computer 30 controls the acquisition of video data from the cameras and processes that data to determine the angle between the right- and left-hand cameras and the target.

Figure 10:
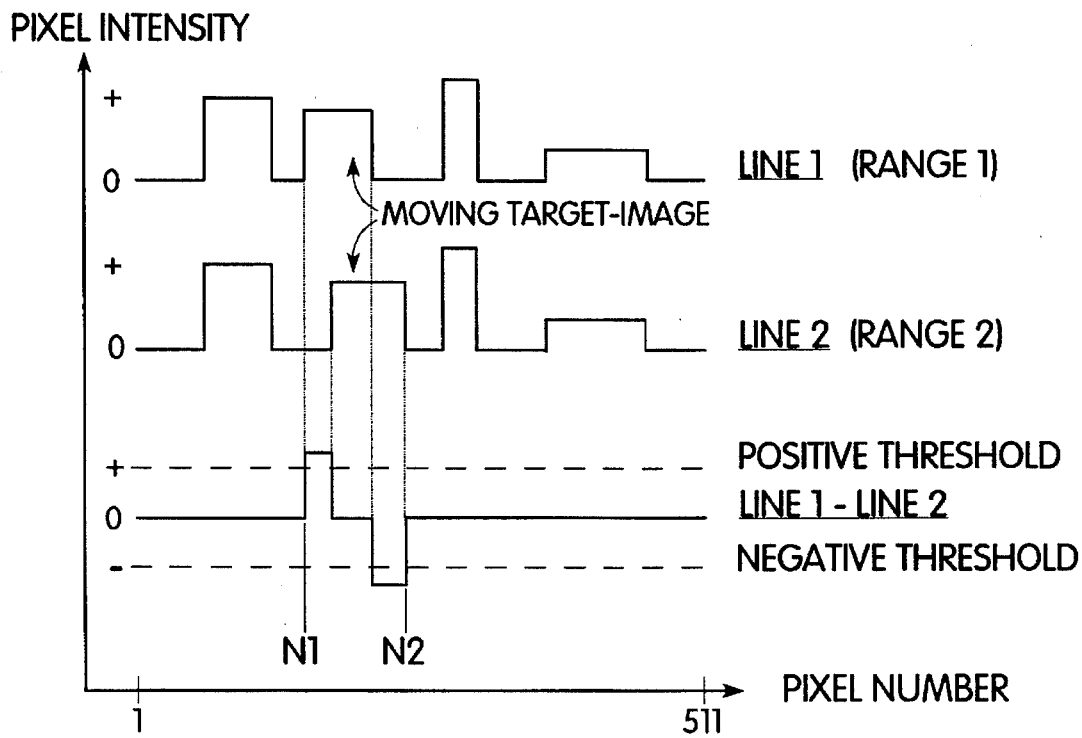
FIG. 10 is a waveform diagram illustrating a second method of determining an offset angle between the cameras and the line of sight, termed the edge detection method.

Referring to FIG. 10, the underlying theory of the edge detection method is that a moving target will change position in the overlapping fields of view of the two narrow field-of-view cameras while the background will remain essentially the same. By eliminating background video data, the right-hand and left-hand edges of the moving target may be determined and the angle to the target may then be calculated. In FIG. 10 a line of video data termed LINE 1 shows an image in the field of view of the right- and left-hand cameras. LINE 2 is a video image of the same field of view but taken at a later time. As the diagram shows, the video line images are nearly identical except for the apparent movement of an object which is presumed to be a moving target image. If LINE 1 is subtracted by LINE 2, the background video information is eliminated and the edges of the moving target are seen as video pulses that exceed predetermined positive and negative thresholds. This locates the edges of the moving target, and, armed with this information, the system can calculate the location of the center of the moving target and thus the angle to the target.

Figure 11A:
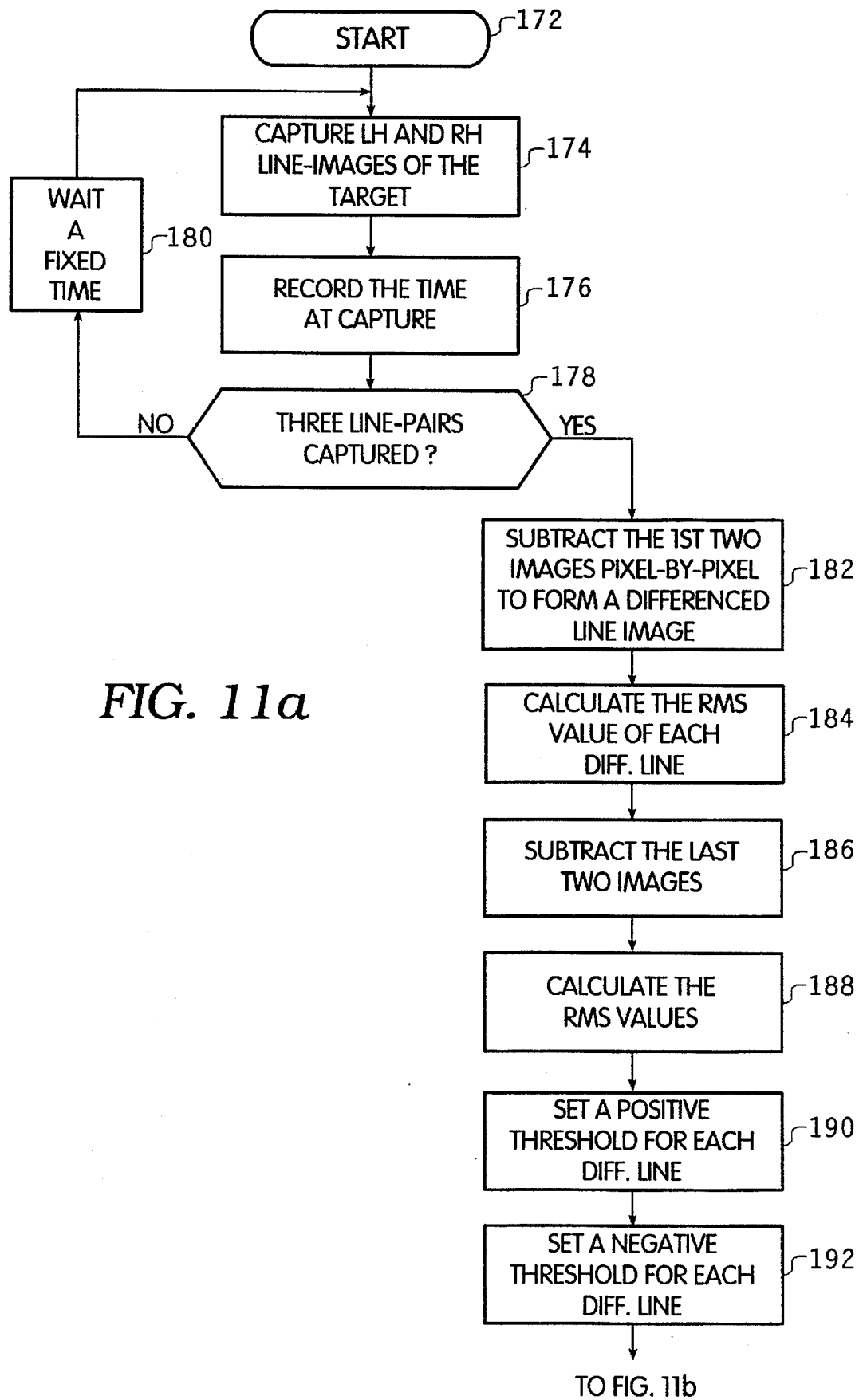
FIGS. 11a–11c are a flow chart diagram illustrating the edge detection capture method illustrated in FIG. 10.
Figure 11B:
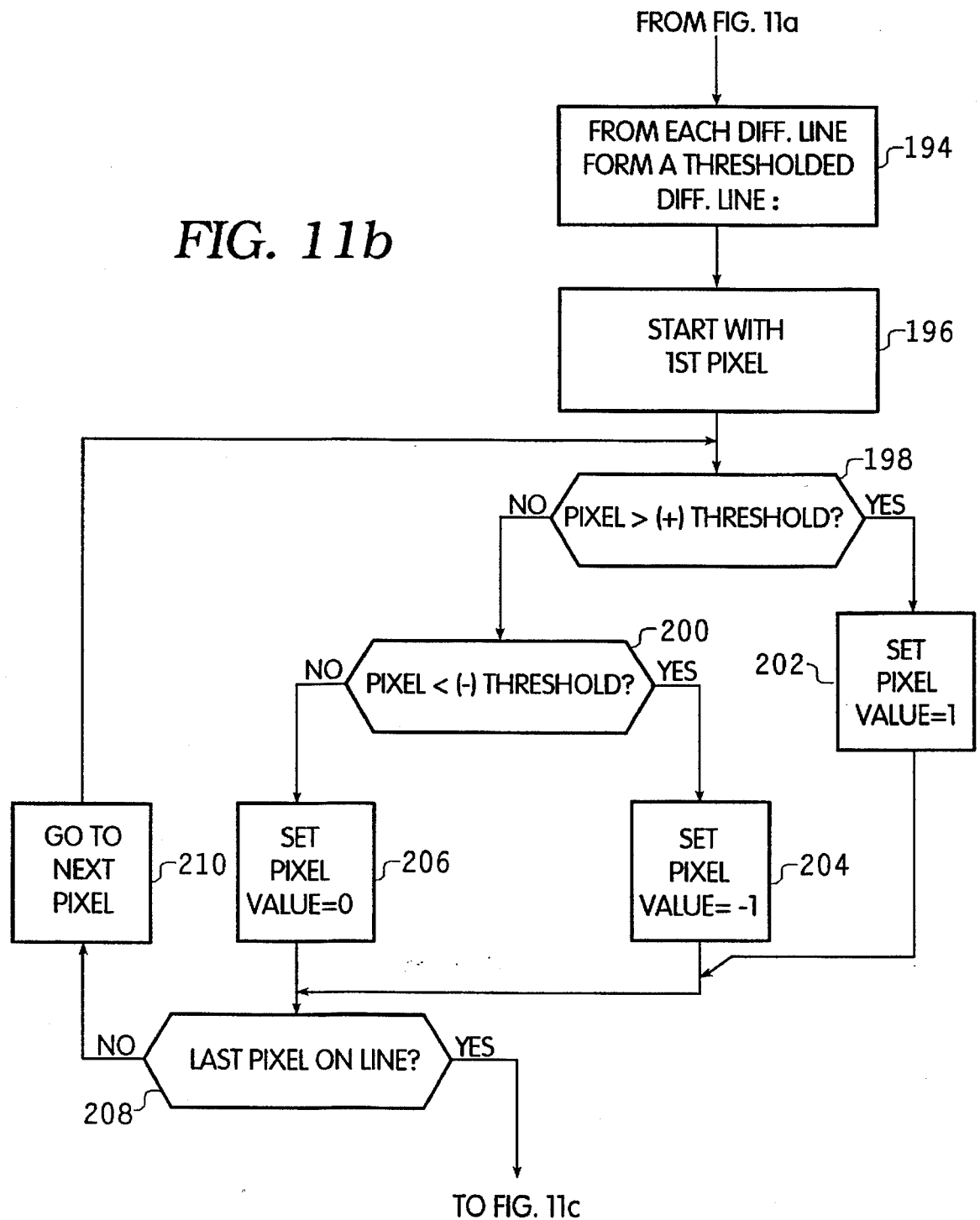
Figure 11C:
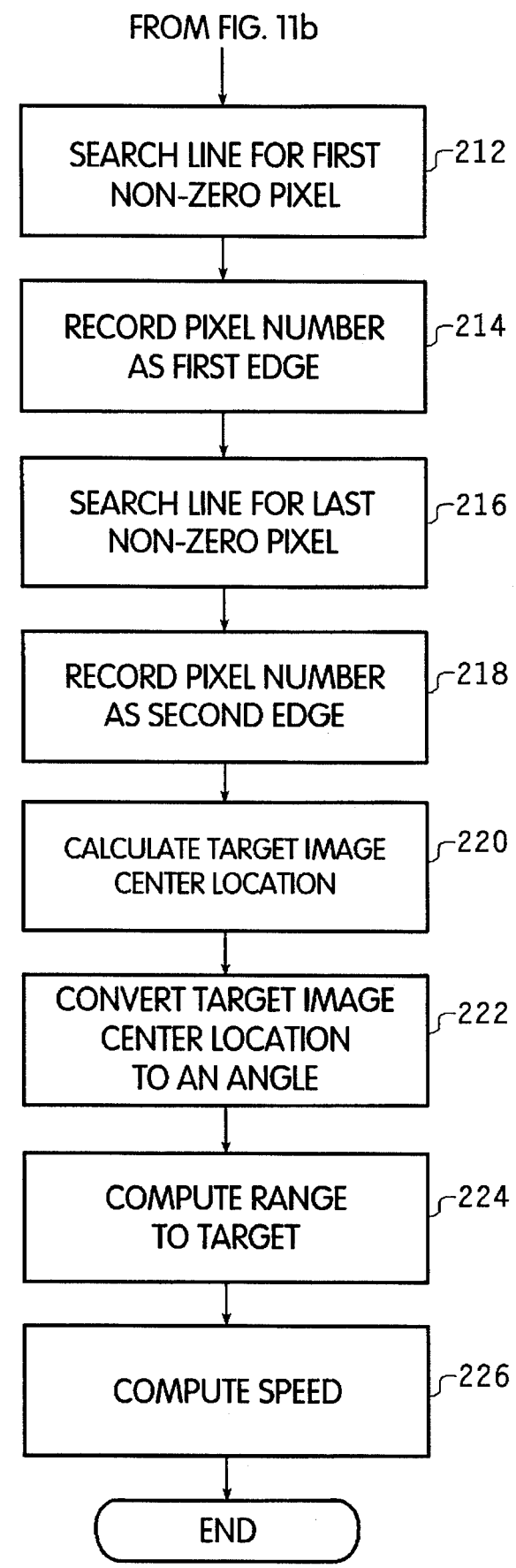

This method is illustrated in the flow chart diagram shown in FIG. 11a through 11c. At start (block 72) the cameras capture left-hand and right-hand images of the target (block 174). The time of capture is recorded (block 176) and the process is repeated at three different times until three line pairs are captured (blocks 178 and 180). The system then subtracts the first two images pixel by pixel to form a differential line image (block 182). Next, the root mean square (rms) value of each differential line is calculated (block 184). The same process then occurs for the second and third line image pair (blocks 186 and 188). The system then sets positive and negative thresholds for each differential line image (blocks 190 and 192) as a function of the rms values. From these operations a "thresholded" differential line is obtained (block 194). Up to this point the system has obtained data representing a differential video line image that corresponds to the bottom waveform of FIG. 10. The system must then calculate the position of respective left-hand and right-hand edges. It does so by starting with the first pixel in the line and determining whether that pixel is above the positive threshold or below the negative threshold (blocks 196, 198 and 200). Depending upon the decisions at blocks 198 and 200, pixel values are either given a positive 1, a negative 1, or a zero value (blocks 202, 204 and 206). This process repeats until the last pixel on the line is reached (blocks 208 and 210). Referring to FIG. 11c, once the pixel values have been obtained and stored in memory, the software searches for the first non-zero pixel (block 212) and this pixel number is recorded as a first edge of the target image (block 214). The system then searches for the last non-zero pixel (block 216) and records this pixel number as the second edge of the target image (block 218). The target image center location may then be calculated (block 220). This calculation yields a pixel offset number which may then be converted into an angle in the manner described in FIG. 9e (block 222). Next, the range to the target for each differential line pair may be calculated (block 224) and, with this information, the system is able to calculate the speed (block 226) in the manner shown in FIGS. 9e and 9f.

It should be noted that the edge detection method does not assume that the target image includes a point centered midway between the left-hand and righthand cameras. In fact, the more general geometric relation shown in FIG. 6 applies. Thus, in order to determine the range R, φLH and φRH must both be known. In calculating these angles, the only approximation made is that φ is directly proportional to the pixel offset which represents the midpoint between the two target edges. This will hold true when R is much greater than b.

The angle φ for both the right-hand and left-hand cameras is calculated by determining the displacement of the target image center from the line of sight. The line of sight for both the right-hand and left-hand cameras is the pixel position which corresponds to the center of the image line scan. By simply counting from the center of the line scan to the calculated position of the center of the target image, a distance d can be obtained for both the right-hand and left-hand cameras and φ will then be equal to a proportionality constant multiplied by the distance d. It should also be observed that with reference to FIG. 6 angle α is equal to 90° minus φLH and γ is equal to 90° minus φ RH. The range is, therefore, calculated according to the following expression:

$$R = \sqrt{(a \sin \gamma)^2 + (c \cos\alpha - b/2)^2}$$

These calculations are performed by the software at blocks 222 and 224 of FIG. 11c. The speed is then calculated according to the method previously described above at block 226.

The edge detection method works best for objects travelling parallel to the baseline b across the field of view of the cameras. However, the system will also work for objects entering the field of view in a direction perpendicular to the baseline or at an obtuse angle. Adjustments in the calculation algorithm may be made to include a trigonometric function which accounts for differences in the angular orientation of the moving target with respect to the field of view. This will be a known quantity which can be represented by a constant, since for applications such as traffic control, the moving objects travel in an undeviating straight line across the field of view.

Figure 12:
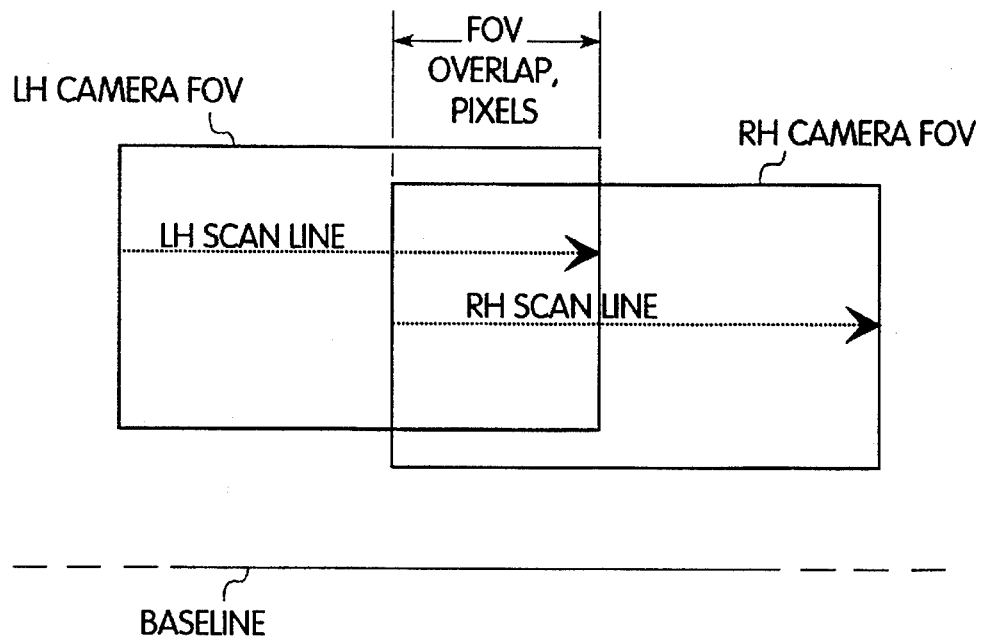
FIG. 12 is a schematic view of the fields of view of right and left camera lenses arranged in the system illustrated in FIG. 7.
Figure 13:
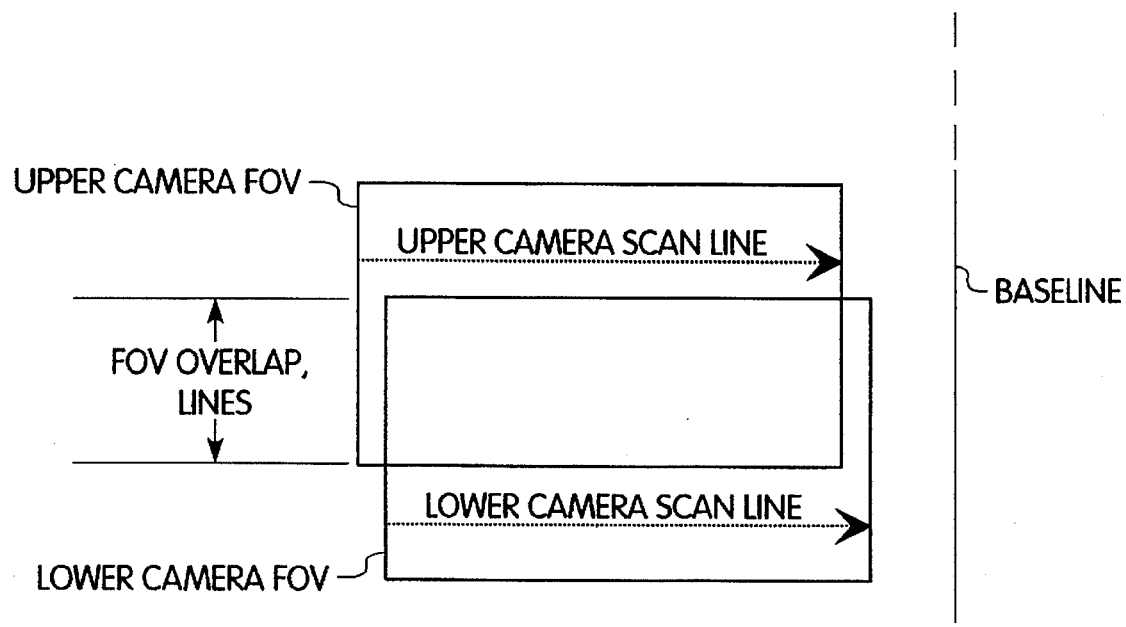
FIG. 13 is a schematic diagram of overlapping fields of view of camera lenses arranged so that the CCD line scan is perpendicular to a vertical baseline.
Figure 14:
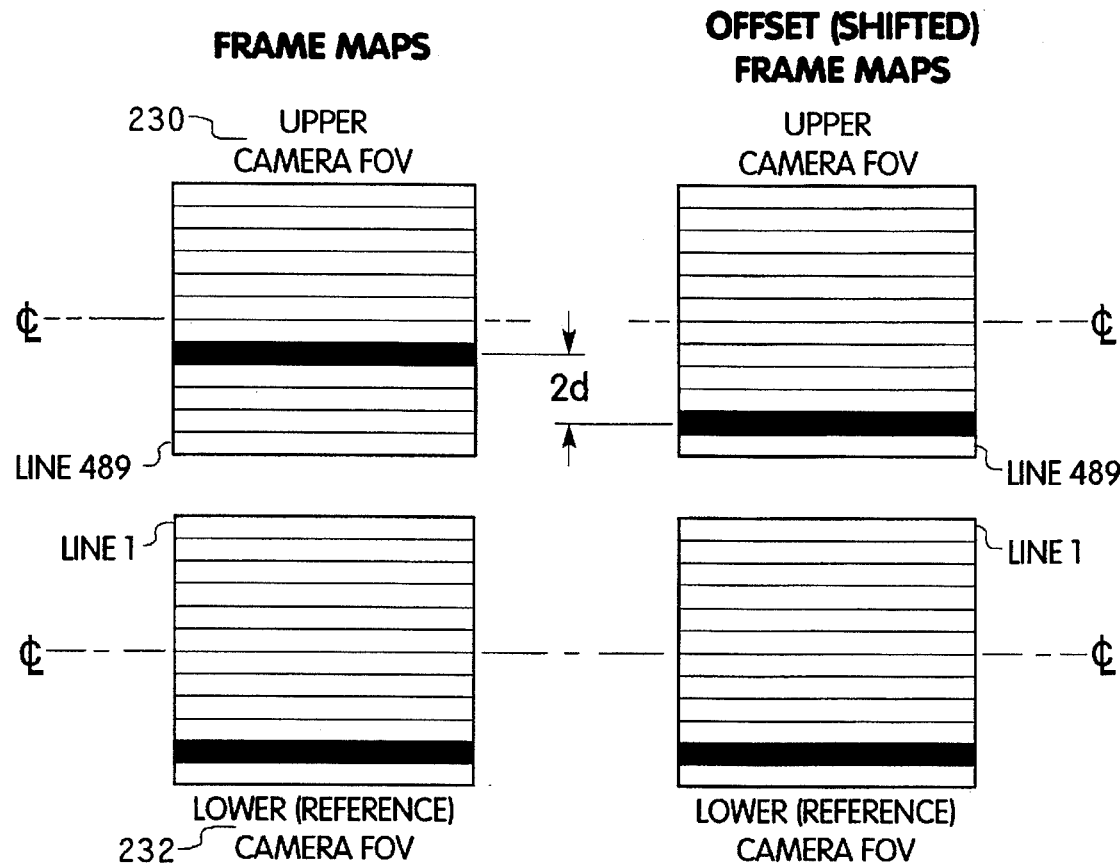
FIG. 14 is a schematic representation of the pixel frame maps produced by camera lenses arranged along a vertical baseline as illustrated in FIG. 13.

Yet a third embodiment of the invention is shown in FIGS. 13, 14, 15 and 16. Referring to FIG. 12 it can be seen that in the preferred embodiment of the invention, the video scan lines for the left-hand and right-hand camera lenses are parallel to the baseline. (The fields of view of the left-hand and right-hand camera lenses are offset vertically for purposes of illustration only.) A different configuration is shown in FIG. 13 in which the cameras are mounted along a vertical baseline a predetermined distance apart and the scan lines extend perpendicular to the baseline. The cameras could also be mounted in the horizontal plane but in such a case the scan lines on the light sensitive device would be rotated 90°. The difference in performance is illustrated in FIG. 14. In this embodiment the pixel maps consist of complete lines of video data instead of fractions of lines. Resolution is higher for this embodiment because a complete line of video data takes the place of a fraction of a line that can be as short as 100 pixels. There may be as many as 489 lines having at least 500 pixels per line in conventional camera systems which would employ this technique. As with the single line scan embodiment, an offset distance d will be determined which represents an offset from the center of the field of view to the estimated location of the target image. Although resolution of the global null for this embodiment is better, processing time is slower because of the need to scan an entire frame consisting of as many as 489 lines, and the memory for storing the video data must be made larger in order to accommodate the additional information.

Figure 15:
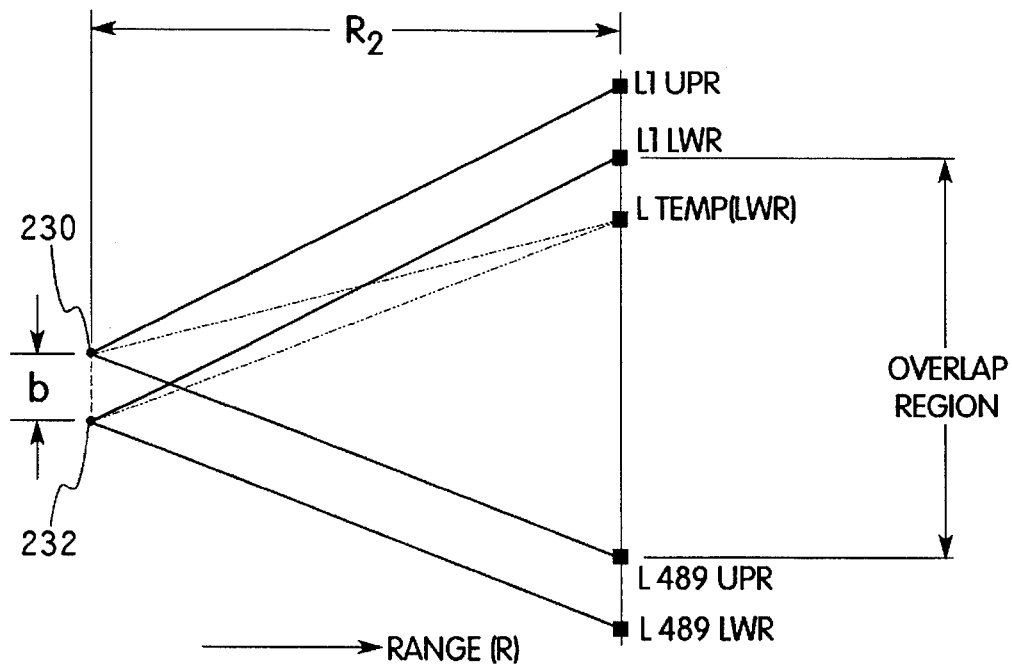
FIG. 15 is a schematic representation of the geometry of the perpendicular line scan camera arrangement with upper and lower camera lenses oriented along a vertical baseline.

FIG. 15 shows the system configured with an upper camera 230 and a lower camera 232 mounted along a vertical baseline and separated by a distance b. The upper camera 230 includes a field of view that extends from L1 UPR to L489 UPR. The lower camera includes a field of view that extends from L1 LWR to L489 LWR. At each range there is an overlap region which is shown between the vertical arrows on the right side of the drawing. The drawing shows the overlap region at a range $R_2$. The dashed lines extending from the upper and lower cameras 230 and 232, respectively, indicate the position of an arbitrarily chosen scanning line, termed hereinafter a "template" line. This line is labeled L TEMP (LWR) in FIG. 15. The template line is an image scan line containing at least a portion of the target image at any arbitrary range. The pixel intensities from all lines (the entire frame) of the upper camera are compared to the template line. (Only the pixel intensities from the template line of the lower camera are mapped in computer memory.) The upper camera output is then shifted and compared, line by line, to the single template line from the lower camera frame map until the image line locations correlate. This occurs at a total shift of $2d$ lines. This relationship is illustrated as shown in FIG. 14 where a selected line in the upper camera field of view is shifted a distance of $2d$ lines in order to correlate with the template (dark) line in the lower camera field of view. The software processing for this embodiment is very similar to that shown in FIGS. 9a–9f. The exception is that the flow chart diagram of FIG. 16 is substituted in this case for the flow chart diagram of FIG. 9b.

Figure 16:
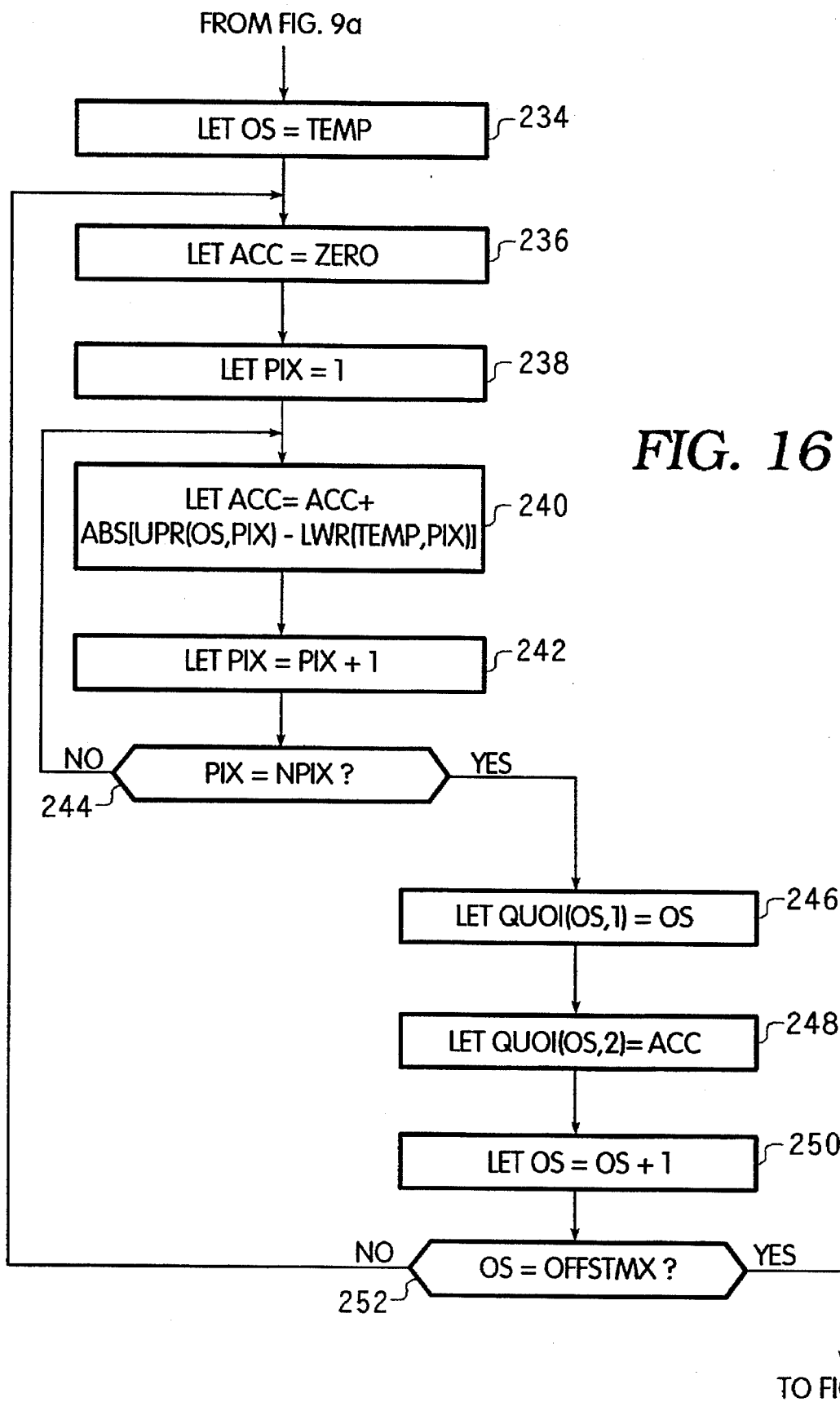
FIG. 16 is a schematic flow chart diagram illustrating a method of calculating the pixel offset when the cameras are arranged along the vertical baseline as illustrated in FIG. 15.

Referring to FIG. 16 the offset is made equal to the template line (block 234). ACC is set equal to 0 (block 236) and PIX is set equal to 1 (block 238). ACC is then made equal to the absolute difference between an arbitrary line in the upper field of view and the template line (block 240). The variable PIX is incremented and the process is repeated until PIX equals NPIX (blocks 242 and 244). The variable PIX is an array pointer variable common to both arrays and thus points to the like numbered pixel in both arrays. The line pointer for the upper map is the variable OS whereas the line pointer for the lower array is a constant (TEMP). QU01 is a two-dimensional array containing the sums of differences and the offset values at which they were calculated. Note that the sums of differences in this case do not need to be normalized since all are made up of the same number of differences. The process proceeds until the maximum possible offset is reached and all values of QU01 have been calculated (blocks 246, 248, 250 and 252). The program then goes to FIG. 9C to calculate the nulls and to find the global null. The only difference will be in the value of the proportionality constant 8PIX which is now made a function of the distance between the centers of adjacent lines instead of between the centers of adjacent pixels.

In addition to the three foregoing signal processing methods for operating on the captured video data, several hardware modifications are also possible without departing from the spirit of the invention.

Figure 17:
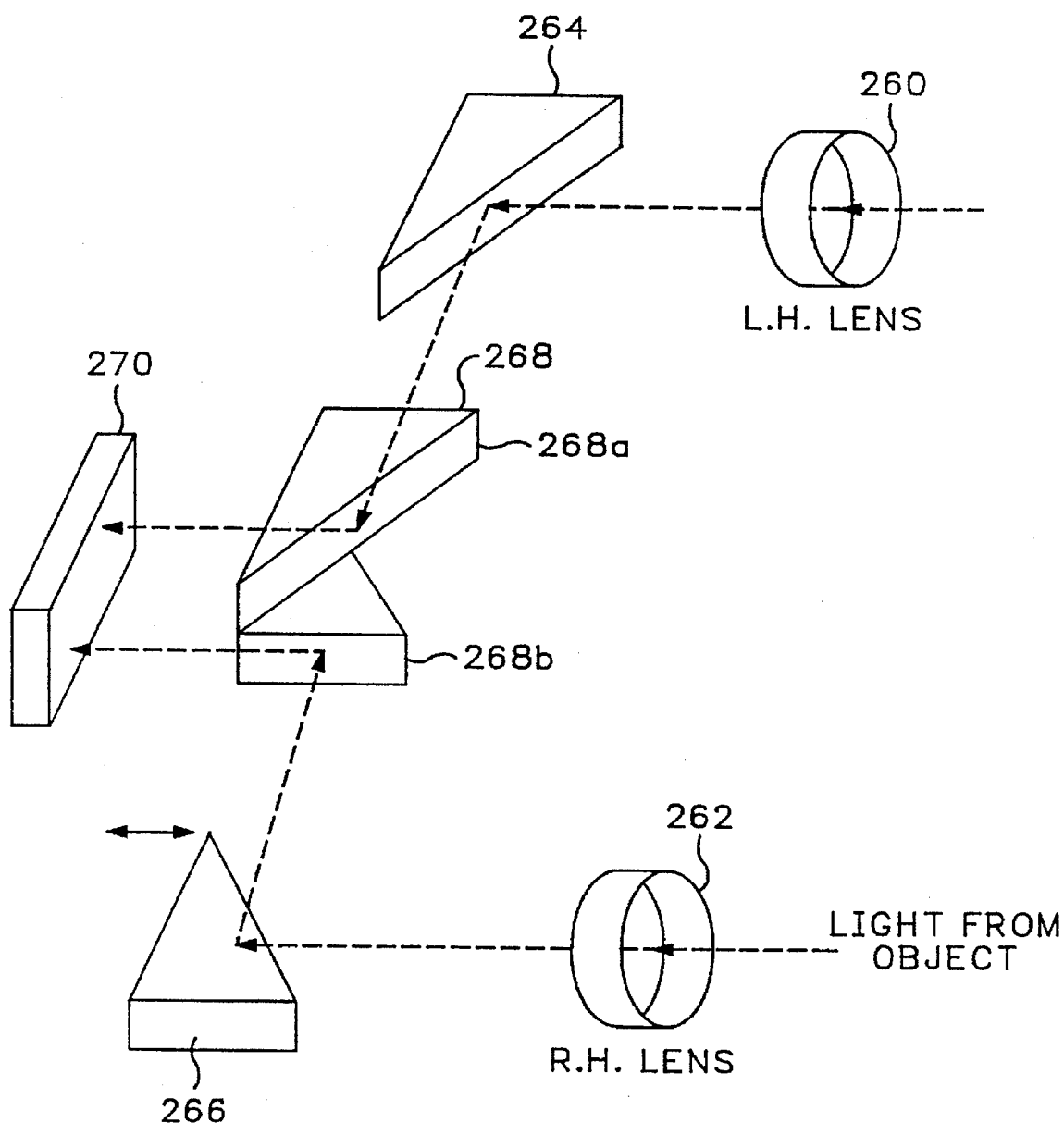
FIG. 17 is a schematic diagram in perspective view showing an embodiment of an invention using a single camera having dual side-by-side lenses scanning the CCD parallel to the baseline.

The right- and left-hand cameras used to produce the line images for processing according to the three methods described above may be consolidated into a single camera. FIG. 17 shows a schematic view of such an arrangement. In FIG. 17 a left-hand lens 260 and a right-hand lens 262 focus light through a pair of reflective prisms 264 and 266, respectively. These prisms direct light onto a stacked prism arrangement 268 having an upper and lower prism 268a and 268b, respectively. The upper and lower prisms 268a and 268b reflect the light onto different regions of a single CCD line or area camera chip 270. The configuration of FIG. 17 is useful primarily for the single line scanning method of FIG. 7 and the edge detection method of FIG. 10.

Figure 19:
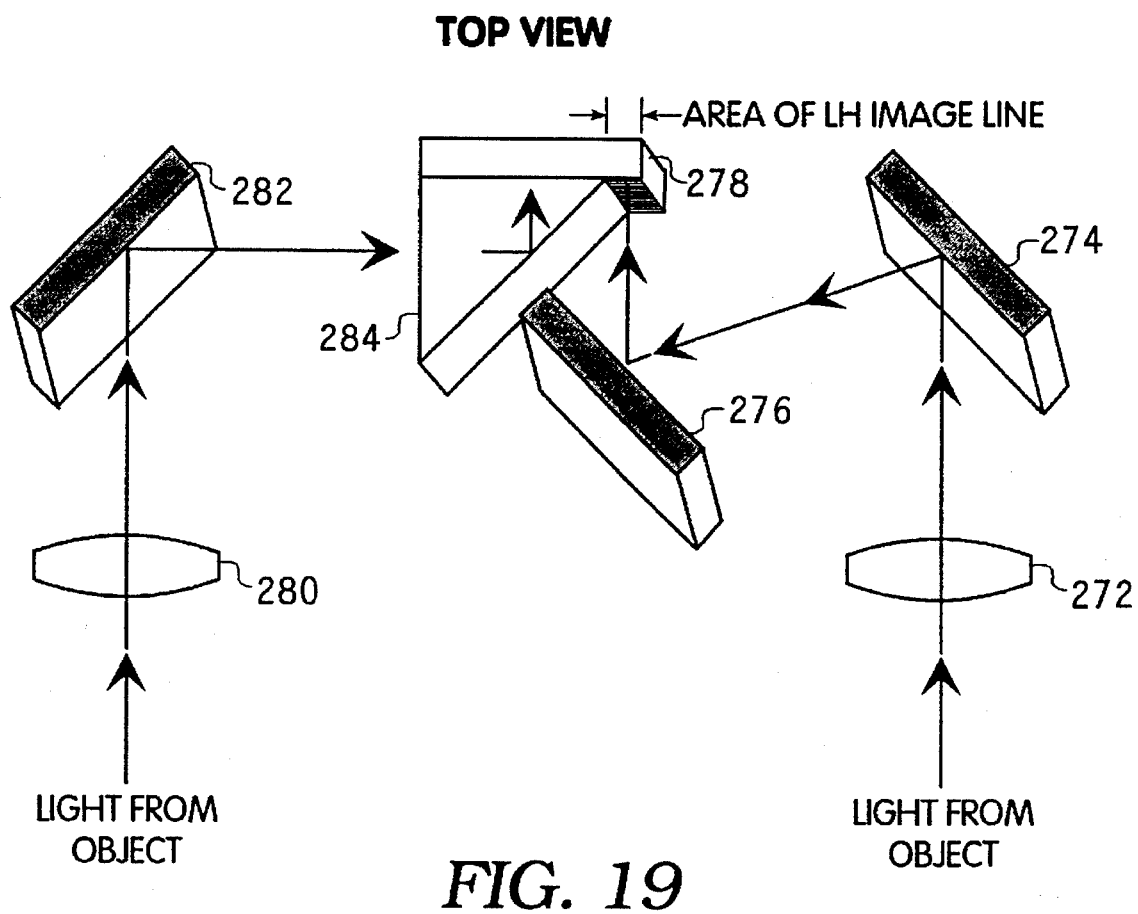
FIG. 19 is a schematic diagram showing a perspective view of another embodiment of the invention using a single camera having dual lenses mounted for scanning the CCD perpendicular to the baseline.

A configuration appropriate to the multiple line scanning method is shown in FIG. 19. In this figure the lenses are mounted side-by-side but the line scanning is conducted in a plane perpendicular to the plane of the drawing. Light from the object enters a left-hand lens 272 and is reflected off of mirrors 274 and 276 onto a CCD 278. A small area in the top of the field of view of the lens 272 is chosen and dedicated to the left-hand lens. This area is shown between the arrows and represents the template line scanning area. The rest of the CCD 278 may be scanned by light from the right-hand lens 280 reflected from mirror 282 and prism 284. Thus, for both the embodiments of FIG. 17 and FIG. 19 a single camera may be constructed which includes two lenses mounted side-by-side or one on top of the other along a common baseline and the light from both lenses may be imaged onto a single light sensitive device.

Figure 18:
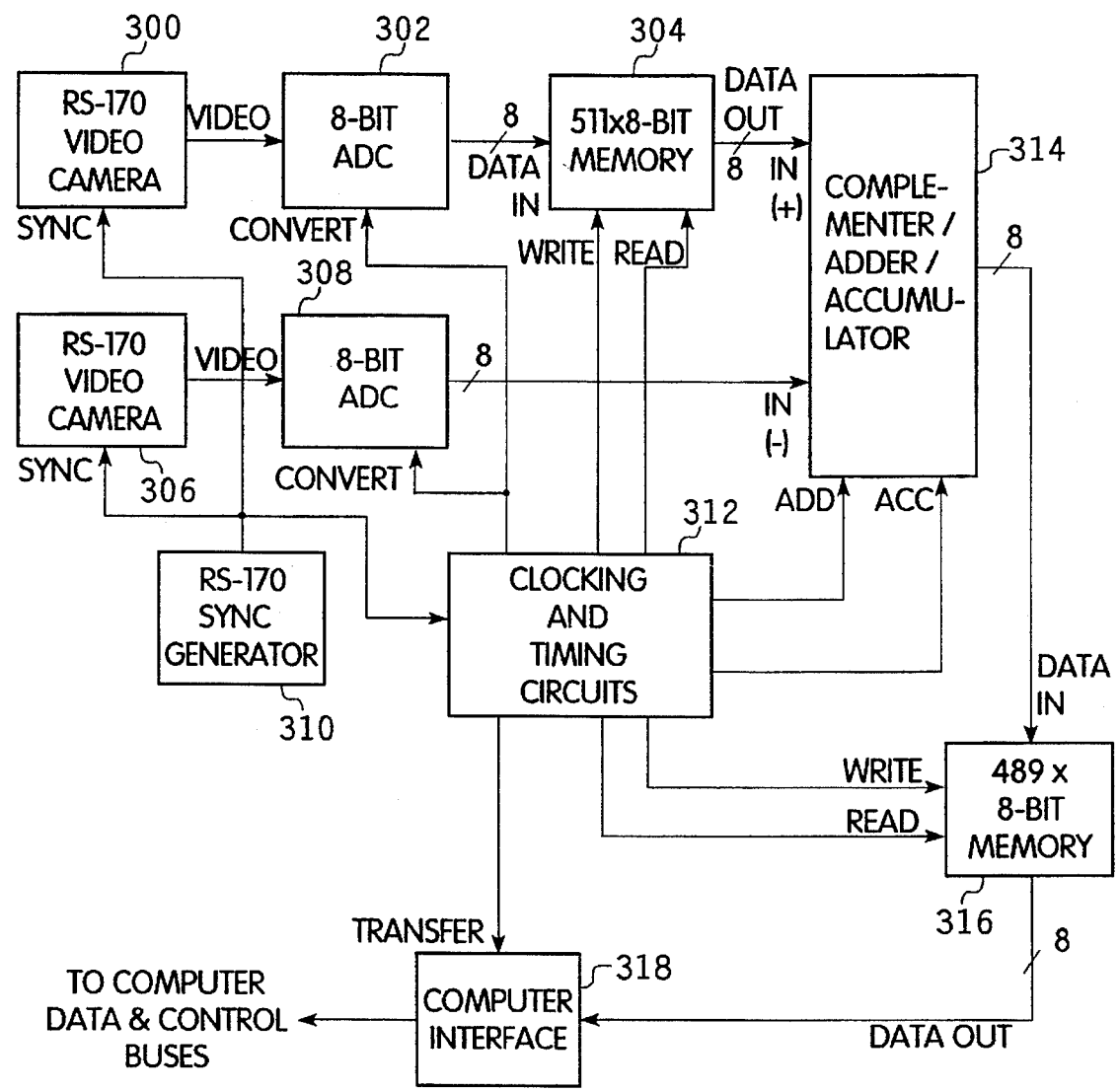
FIG. 18 is a block schematic diagram of a video preprocessor to be used in an alternative embodiment of the invention.

The signal processing for at least a portion of the "baseline perpendicular" multiple line scanning embodiment (FIGS. 13–16) may also be employed as shown in FIG. 18. In FIG. 18 a digital preprocessor replaces the functions performed by the computer in FIG. 16. Additionally, the computer hardware complement of FIG. 3 is altered so that frame grabbers 32 and 34 are no longer needed. This digital preprocessor may be constructed from commonly available off-the-shelf components and significantly reduces the computational requirements of the computer. Range measurements can, therefore, be made more frequently thus improving the accuracy of the speed computation. Also, less RAM is required in the computer. The sums of differences calculations described in the flow chart of FIG. 16 are performed by the preprocessor of FIG. 18 and the results are transferred to a computer interface 318. The upper camera, termed the template camera 300, transfers video to an eight bit analog-to-digital converter 302. The output of the eight bit ADC is provided to a 512 (pixel) by eight bit memory 304. The lower or frame camera 306 transfers video to its eight bit ADC 308. Both cameras can be RS 170 standard video cameras synchronized by an RS 170 sync generator 310. Clocking and timing circuits 312 cause digital video data representing the template line to be stored in the memory and clocked out later and summed with the output of ADC 308 in a sums of differences computation device termed a complementor/adder/accumulator 314. Computation device 314 is programmed to operate in accordance with the program outlined on FIG. 16 and provides the two-dimensional sums of differences array to 489×8-bit memory 316. These data are transferred to a computer interface 318. The computer then performs the null search routine and range and speed calculations described in FIGS. 9c through 9f.

The speed calculation for the invention has been described with reference to a pair of range measurements made at times $T_1$ and $T_2$. For situations requiring more accuracy, however multiple range measurements $R_n$ may be made at multiple times $T_n$ and a linear regression algorithm may be applied to the multiple range measurements in order to determine the speed of the target. The linear regression method is an accepted and widely used statistical method for fitting a straight line to a plurality of points plotted in cartesian coordinates. In this system the range would be the ordinate and time would be the abscissa. The linear regression method may be implemented by storing the measured ranges $R_n$ and their associated times $T_n$ in a two-dimensional array in computer memory. Speed may then be determined based upon the magnitude and slope of the line that is fitted to the group of cartesian coordinates. If the algebraic sign of the slope is positive, the target is receding. If negative, the target is approaching. A confidence level which is based upon the square of the range coordinates may also be calculated.

Figures 21, 22A:
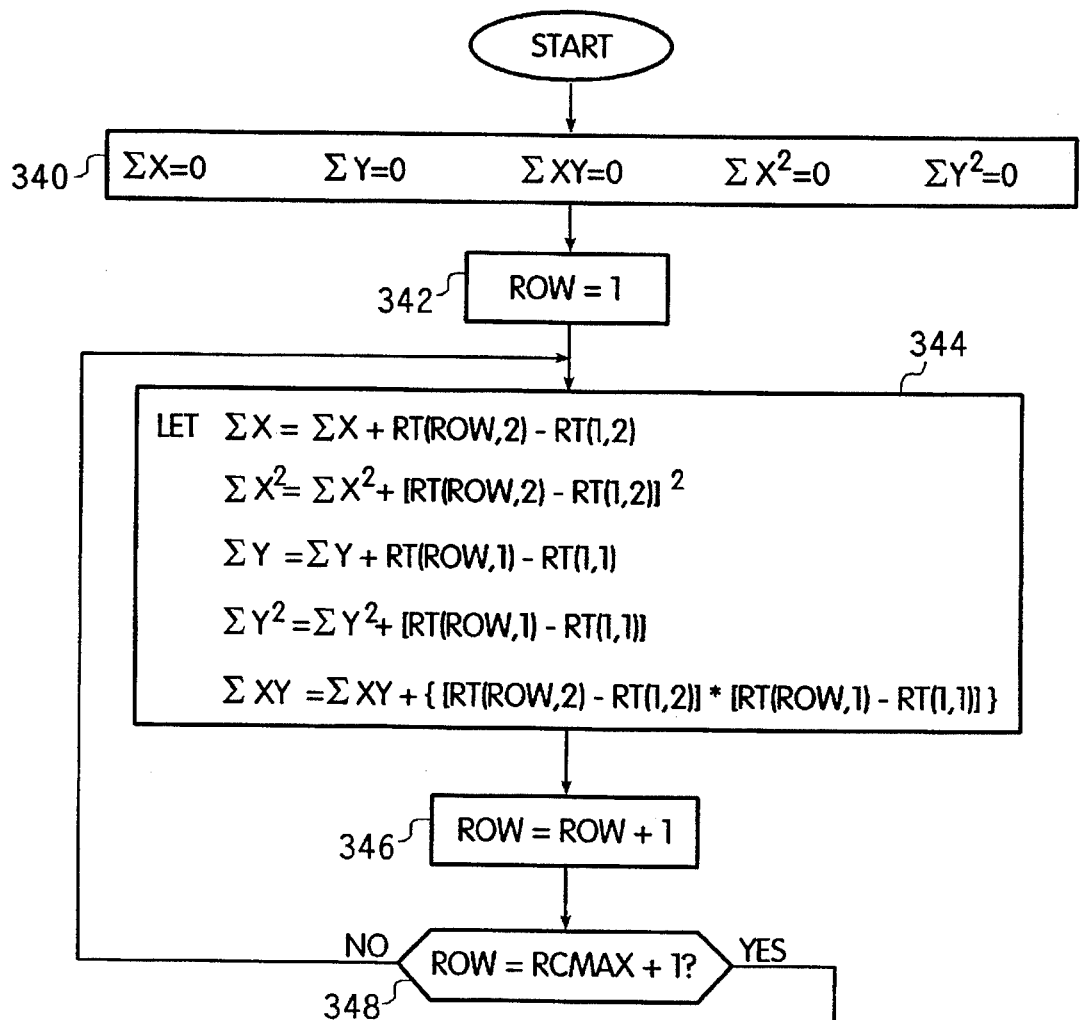

Referring to FIG. 21, an array of range measurements taken at a plurality of times is shown in chart form. The range measurements are shown in column 1 and comprise $R_1, R_2 \ldots R_n$ taken at the times shown in column 2 of T1, $T_2 \ldots T_n$. the number of the measurement is designated by the row number and extends from 1 to RCMAX. The row number indicates an address in memory at which the two-dimensional column array is stored.

Figure 20:
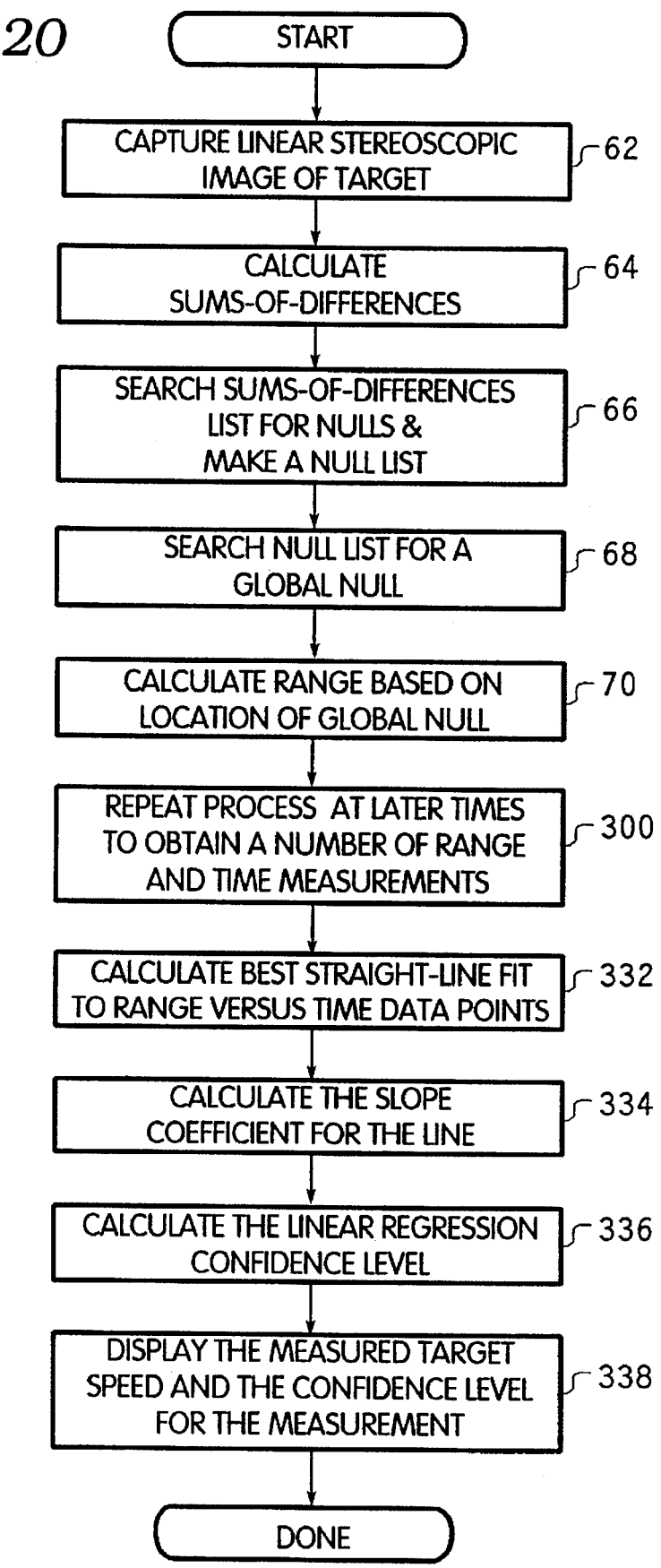
FIG. 20 is a flow chart diagram similar to FIG. 4 illustrating a linear regression method for calculating speed.

FIG. 20 shows a general flow chart diagram of the process of the invention using a linear regression method to calculate the velocity of the moving target. This chart is similar to the chart of FIG. 4. Blocks 62, 64, 66, 68 and 70 are the identical process steps shown in FIG. 4. The difference from the process illustrated in FIG. 4 begins at block 330. At this point the process of blocks 62 through 70 is repeated at later times to obtain a plurality of range and time measurements $R_n$ at times $T_n$. At least three such measurements are obtained (and more could be obtained) depending upon the accuracy desired. Blocks 332, 334 and 336 illustrate the linear regression calculation that yields information regarding the speed of the target. In block 332, a linear regression calculation is undertaken to fit the best straight line to the cartesian data points represented by range and time. In block 334 the slope of this line is calculated. The speed of the target is directly proportional to this slope. At block 336 a confidence level may be calculated. The results of the calculations of blocks 332, 334 and 336 are displayed at block 338.

Referring now to FIGS. 22A and 22B, a mathematical method implemented by the computer 30 is shown which performs the calculations of blocks 332, 334 and 336. At block 340, variables X and Y are initialized. A variable to be entitled "ROW" is set at 1 in block 342. Using variables X, Y and ROW, a linear regression straight line fit for the range and time 5 coordinates represented by variables X and Y is calculated in block 344 in the classical manner. In block 346, the variable ROW is incremented by 1. At block 348, the program loops back to block 344 as long as the variable ROW is not equal to RCMAX plus 1. When ROW is equal to RCMAX plus 1, the program next calculates R based upon the sums of variables X and Y (block 350). At block 352, a confidence level represented by $R^2$ is calculated. The calculation in block 354 represents the slope of the straight line which represents the linear fit to the cartesian coordinates X, Y. The speed is calculated in block 356 by simply multiplying the slope by a constant. In block 358, the speed and confidence level are displayed.

In order to save computation time for certain applications in which fine resolution of the target is not required, correlation between pixel maps may be done at every nth pixel in the overlap region instead of at each pixel offset. The minimum overlap region is about 100 pixels and can extend to 512 pixels. When correlation is performed only with each nth pixel, the selected value of n represents a trade off between the maximum spatial frequency resolvable with the algorithm and the time required to perform the algorithm. For a given processor, this is a trade off between the accuracy of each range measurement and the number of range measurements that can be made in a given time. Thus, when time exists to make more than 2 range measurements on a target, the linear regression technique described above can be used.

In order to implement this variation, the variable PIX plus 1 in block 110 of FIG. 9b would be changed to PIX plus PIXSTEP where PIXSTEP equals n. In block 116, the right hand side of the equation would change to PIXSTEP *ACC/ NPIX minus OS. In FIG. 16, block 242, the variable PIX plus 1 would change to PIX plus PIXSTEP. This technique provides a more course resolution of the target but is much faster since only every nth pixel must be correlated. This permits a larger number of range measurements which would yield greater range accuracy where a technique such as linear regression is used.

Although the invention has been described with reference to detection systems for detecting the speed of moving vehicles it should be understood that the invention described herein has much broader application, and in fact may be used to detect the range to a stationary object, the speed of any moving object and/or relative motion between moving or stationary objects. For example, the invention may be incorporated in a robotics manufacturing or monitoring system for monitoring or operating upon objects moving along an assembly line. Another important application is a ranging device used in conjunction with a weapons system for acquiring and tracking a target. Yet another application is a spotting system used to detect camouflaged objects which may be in motion against a static background. The edge detection embodiment disclosed above is especially useful for this purpose. Other possible uses and applications will be apparent to those skilled in the art.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An electro-optical range finding system comprising:
    (a) a pair of optical lenses, each lens in said pair of optical lenses oriented along a line of sight towards a target, said pair of optical lenses positioned a predetermined width apart along a common baseline;
    (b) at least one light sensitive device responsive to light from each lens in said pair of optical lenses for forming first and second one-dimensional images of said target on first and second linear pixel arrays;
    (c) a video correlator for comparing said first and second one-dimensional images on said first and second linear pixel arrays to find an offset pixel shift between said first and second one-dimensional images on said first and second linear pixel arrays, respectively; and
    (d) a calculator for determining a range to the target as a trigonometric function of said offset pixel shift and said predetermined width between said pair of optical lenses.

2. The electro-optical system of claim 1 wherein there is a separate light sensitive device for each optical lens in said pair of optical lenses.

3. The electro-optical range finding system of claim 2 wherein said light sensitive devices are video cameras, each video camera containing a charge coupled device.

4. The electro-optical range finding system of claim 1 wherein said video correlator includes a computer programmed with a correlation algorithm for finding a global null of sums of differences between said first and second one-dimensional images to determine said offset pixel shift.

5. In an electro-optical ranging device, a method of determining a range to a target object comprising the steps of:
    (a) providing first and second optical lenses spaced a predetermined distance apart along a common baseline, said optical lenses having overlapping fields of view;
    (b) directing light from said first and second optical lenses onto at least one optically sensitive device;

(c) electronically scanning said light sensitive device in a region thereon responsive to said first optical lens to establish a one-dimensional template image along a predetermined scan line;

(d) successively electronically scanning said light sensitive device in a region thereon responsive to said second optical lens to determine a plurality of one-dimensional images;

(e) comparing each of said plurality of one-dimensional images with said one-dimensional template image to determine which of said plurality of one-dimensional images most closely correlates with said template image;

(f) determining a line distance between said template image and said one-dimensional image which most closely correlates with said template image; and (g) calculating a range to said target object as a function of said line distance and said predetermined distance.

6. The method of claim 5 wherein said light sensitive device is electronically scanned in a direction perpendicular to said base line.

7. The method of claim 6 wherein said optical lenses are mounted a predetermined vertical distance apart along a vertical common baseline.

* * * * *